United States Patent [19]

Sundfeld et al.

[11] Patent Number: 5,370,890

[45] Date of Patent: Dec. 6, 1994

[54] AQUEOUS PROCESS TO REMOVE CHOLESTEROL FROM FOOD PRODUCTS

[75] Inventors: Esdras Sundfeld; John M. Krochta, both of Davis, Calif.; Thomas Richardson, Berthoud, Colo.

[73] Assignee: The Regents of the University of California, Oakland, Calif.

[21] Appl. No.: 980,981

[22] Filed: Nov. 24, 1992

Related U.S. Application Data

[63] Continuation-in-part of Ser. No. 906,108, Jul. 6, 1992, Pat. No. 5,326,579.

[51] Int. Cl.$^5$ .............................................. A23D 7/00
[52] U.S. Cl. .................................. 426/417; 426/422; 426/478; 426/491; 554/212
[58] Field of Search ............... 426/417, 422, 423, 478, 426/490, 491, 495, 614; 554/212

[56] References Cited

U.S. PATENT DOCUMENTS

| | | | |
|---|---|---|---|
| 3,450,541 | 6/1969 | Schwartz | 99/118 |
| 4,576,097 | 10/1985 | Pitha | 514/26 |
| 5,039,541 | 8/1991 | Keen | 426/417 |
| 5,232,725 | 8/1993 | Roderbourg et al. | 426/417 |

FOREIGN PATENT DOCUMENTS 61591 7/1991 Chile.

OTHER PUBLICATIONS

K. R. Price, et al., "The Chemistry and Biological Significance of Saponins in Food and Feedingstuffs," CRC Critical Reviews in Food Science and Nutrition, vol. 26, Issue I (1987), pp. 27–1.

Courchaine et al. (1959); Zlatkis et al. (1953), "Total and Free Cholesterol Techniques in Lipidology General Analytical Procedures", Techniques of Lipidology, pp. 360–361.

W. W. Christie, Composition and Structure of Milk Lipids, pp. 4–5.

I. Katz, et al. (1968), "Rapid Method for Isolation of Unesterified Sterols and Its Application to Detection of Milk Fat Adulteration with Vegetable Oils," J. Dairy Science, vol. 50, No. 11, 1764–1768.

"Fats (Animal in Vegetable Fats and Oils Determination of Cholesterol) Gas Chromatographic Method Final Action," AOAC Official Methods of Analysis (1984), pp. 522–523.

W. J. Hurst, et al. (1984), "HPLC Determination of the Cholesterol Content of Egg Noodles as an Indicator of Egg Solids," J. Agric. Food Chem., vol. 33, pp. 820–822.

"Fats (Vegetable) in Butterfat Sterol Acetate Melting Point Method Final Action", AOAC Official Methods of Analysis (1984) pp. 520–521.

"Flavoring Agents and Related Substances," CRC Handbook of Food Additives, Appendix 3, pp. 333–334.

Primary Examiner—Donald E. Czaja
Assistant Examiner—Anthony Weier
Attorney, Agent, or Firm—Phillips Moore Lempio & Finley

[57] ABSTRACT

The present invention relates to a process for the removal of cholesterol from a processed food or unprocessed food (dairy) product, which process comprises: (a) obtaining a processed or unprocessed food product containing cholesterol; (b) contacting the food product at a temperature of between about 35° and 80° C. with an amount of saponin effective to bind up to about 90% or more of the cholesterol present in the dairy product; (c) contacting at a temperature of between about 35° and 80° C. the product of (b) with an effective amount of diatomaceous earth; d) separating the insoluble diatomaceous earth containing the cholesterol:saponin complex by decanting, filtration, or centrifugation; and (e) recovering the food product having a reduced content of cholesterol. Preferably, after contacting a food (dairy) product such as butter or butteroil with an aqueous saponin solution at elevated temperature, the aqueous phase containing the cholesterol-saponin complex is removed by centrifugation or decanting and the resulting fat phase is washed with water. No adsorbent is used. The process is without adsorbent particularly useful wherein the food product is a dairy product selected from raw cream, pasteurized cream, butter, butteroil or anhydrous fat. The dairy product having a lowered cholesterol level is useful as a food to reduce cholesterol intake in human beings.

20 Claims, 13 Drawing Sheets

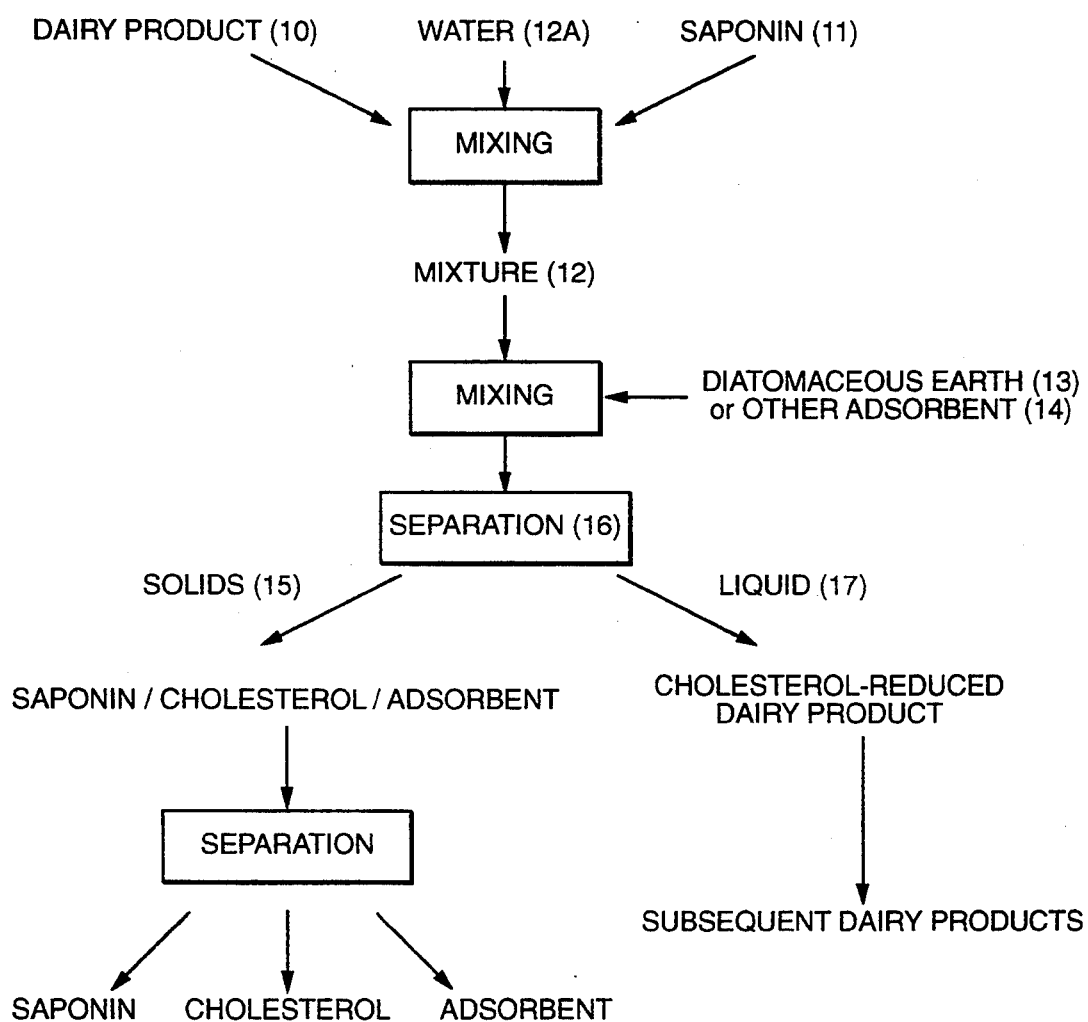
FIG._1

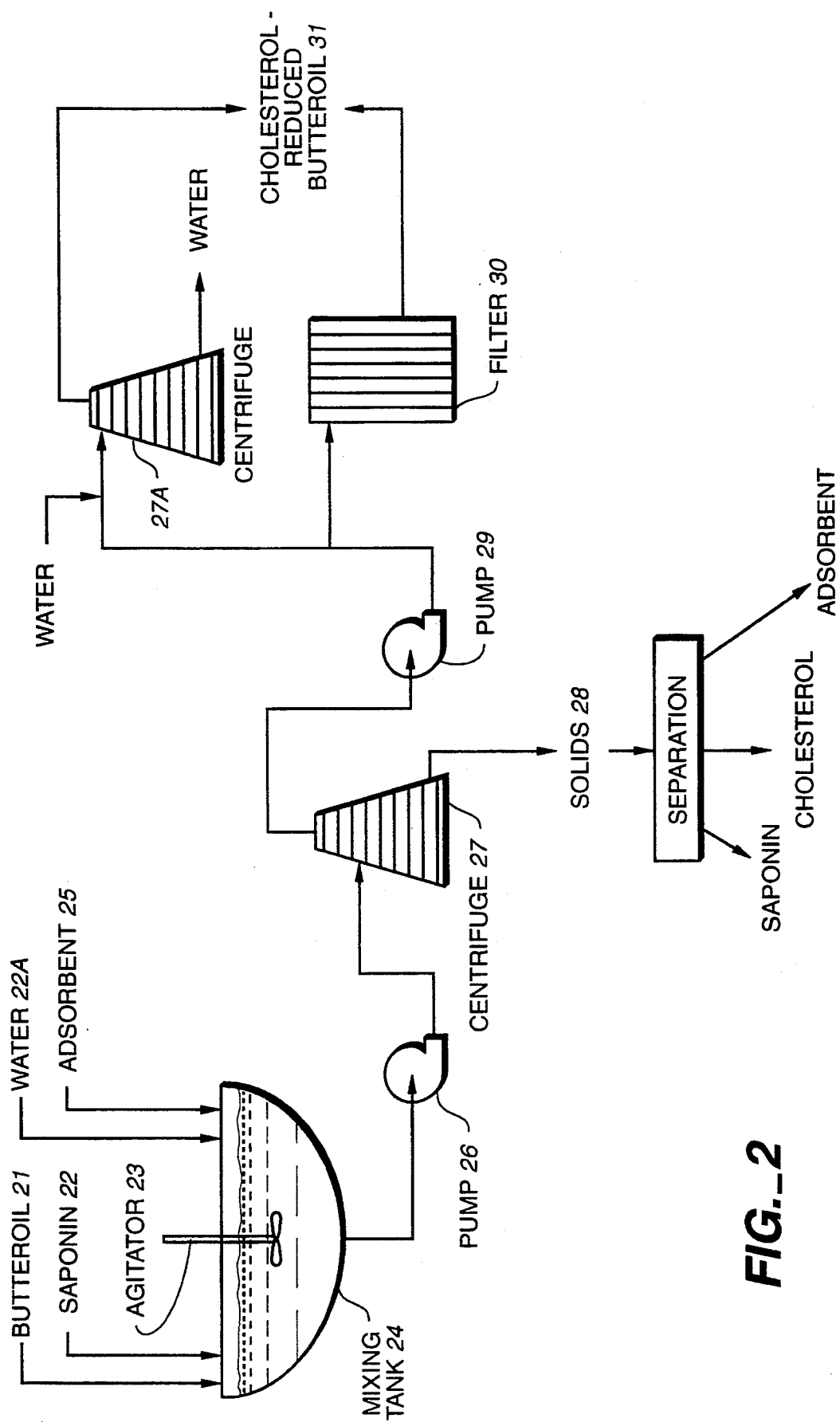
FIG._2

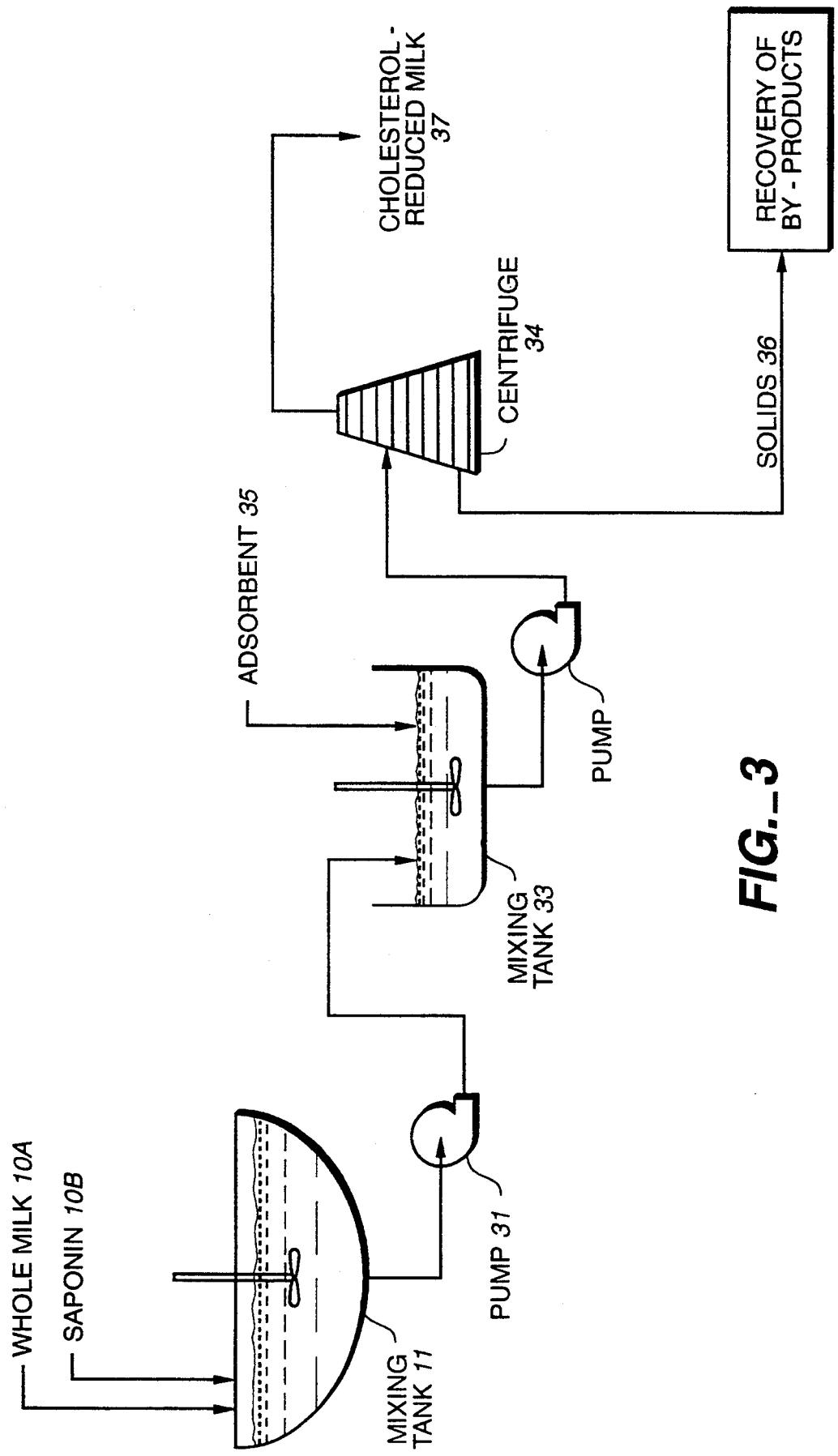
FIG._3

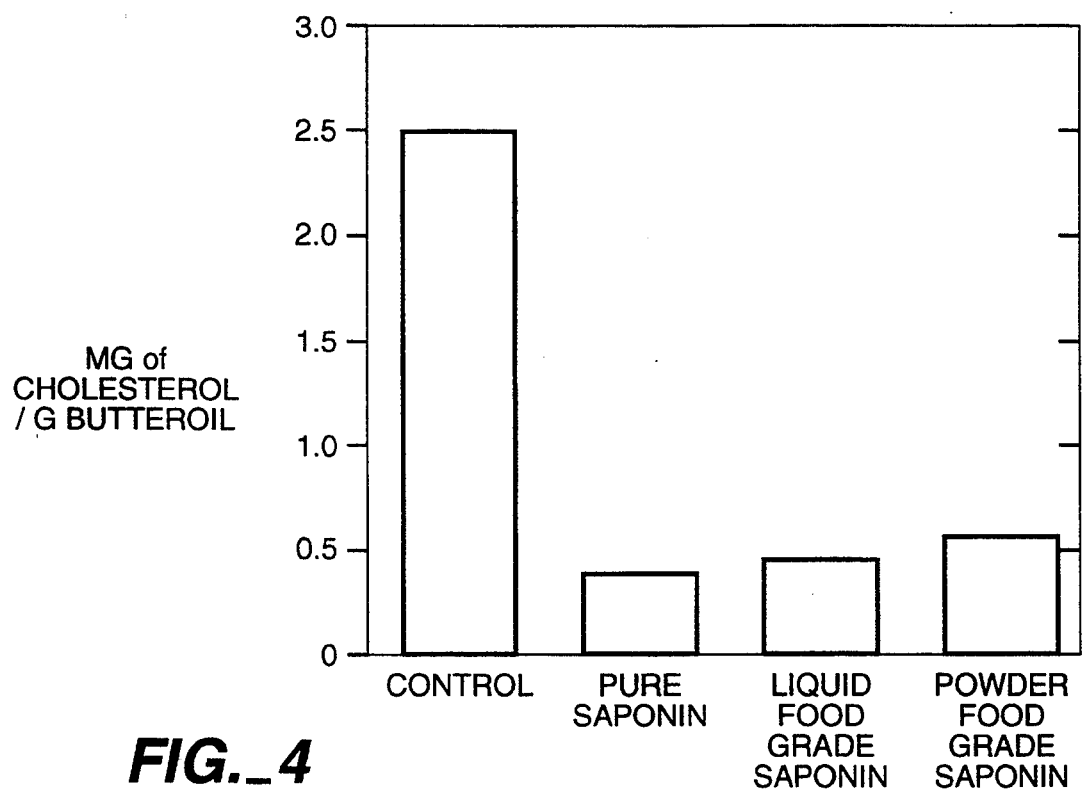
FIG._4
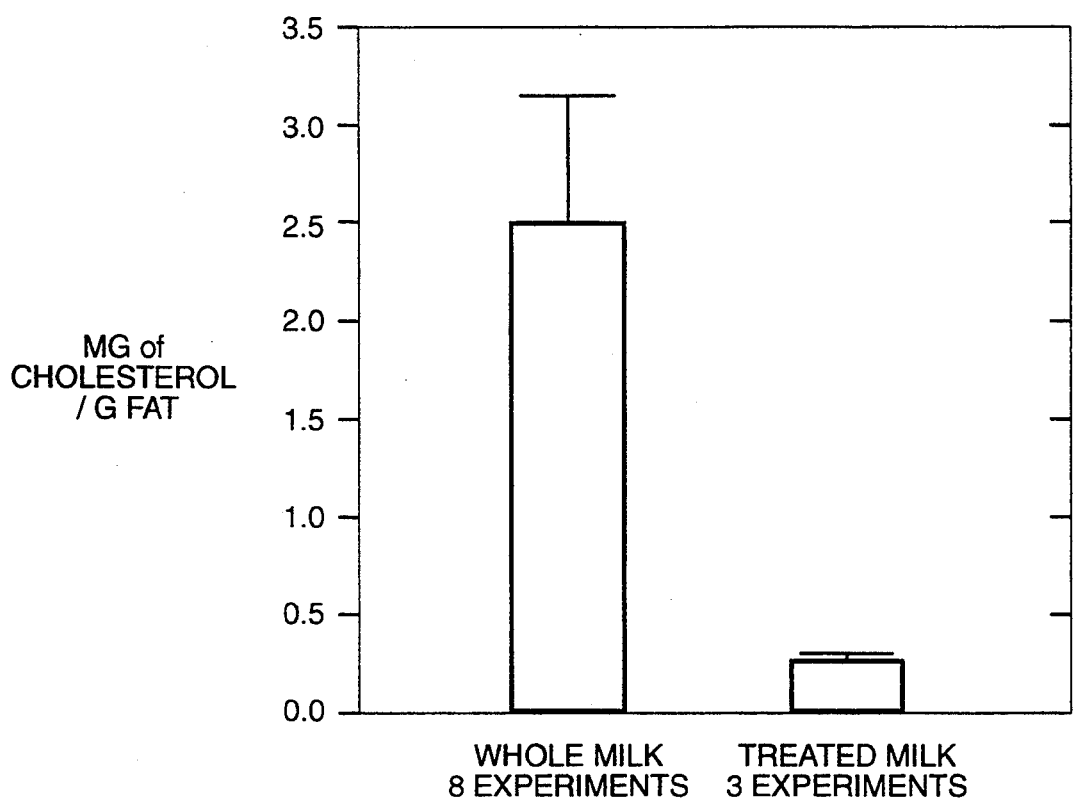
FIG._5

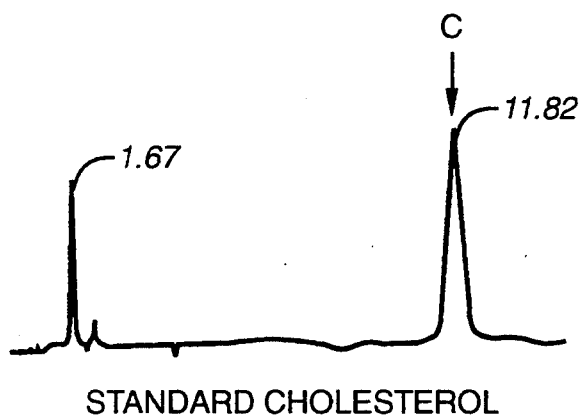
FIG._6A
STANDARD CHOLESTEROL
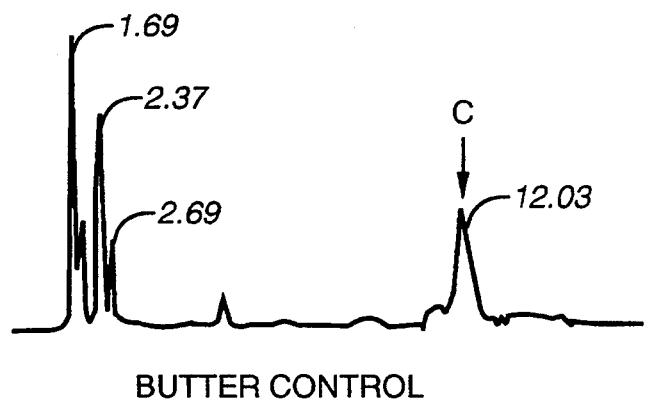
FIG._6B
BUTTER CONTROL
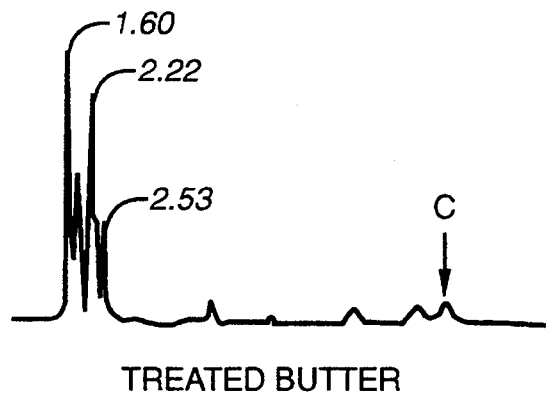
FIG._6C
TREATED BUTTER

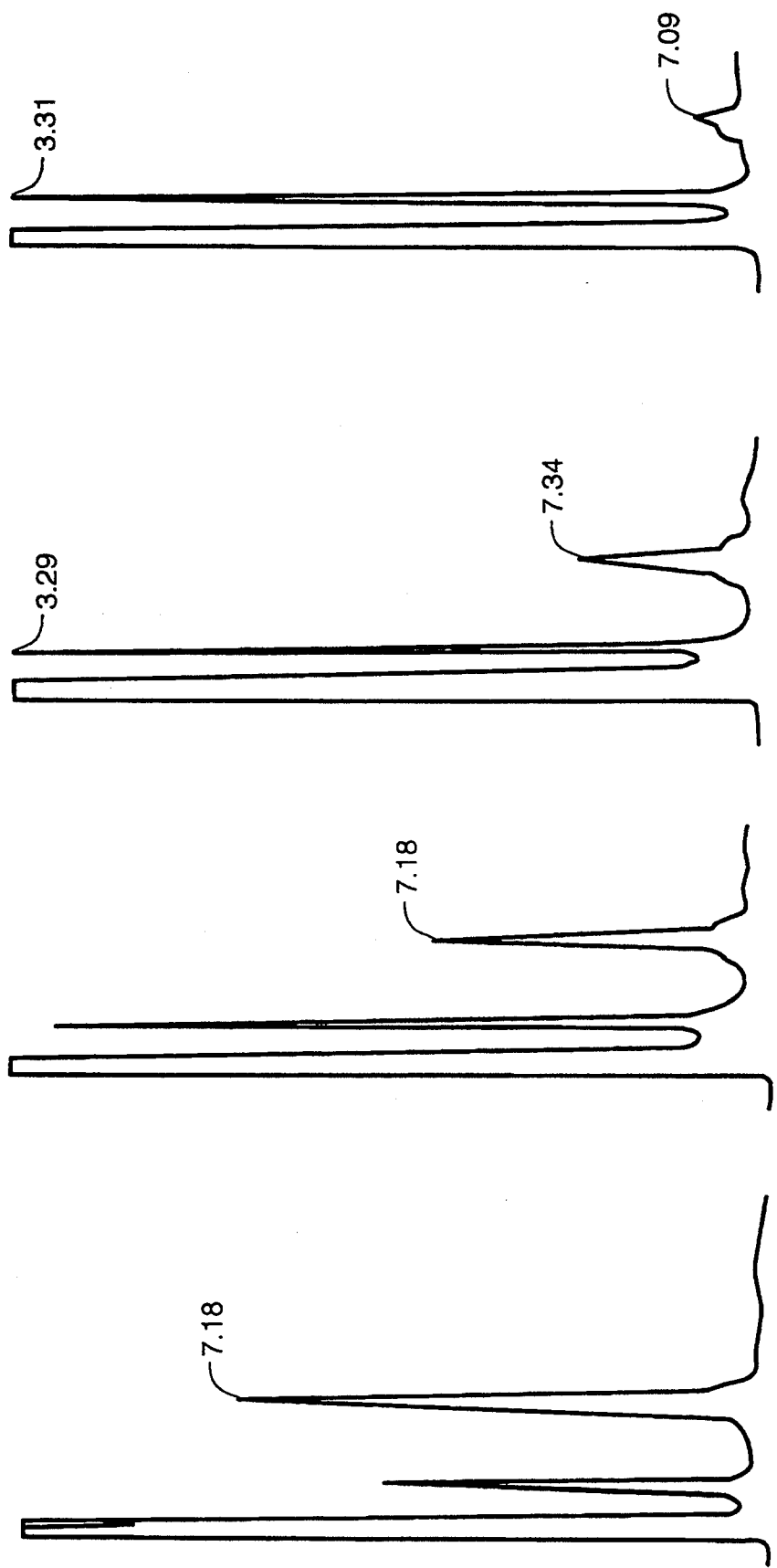

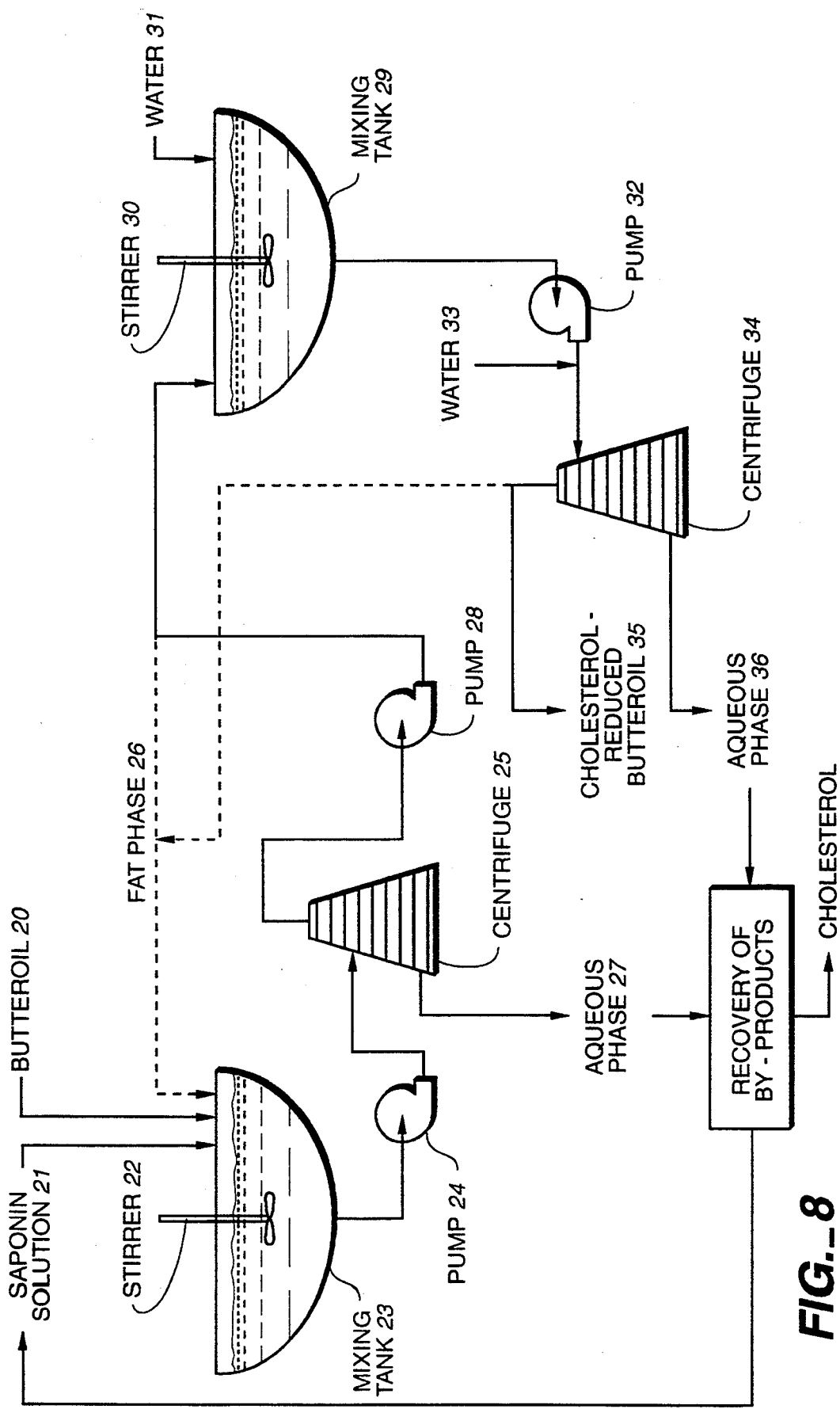
FIG._8

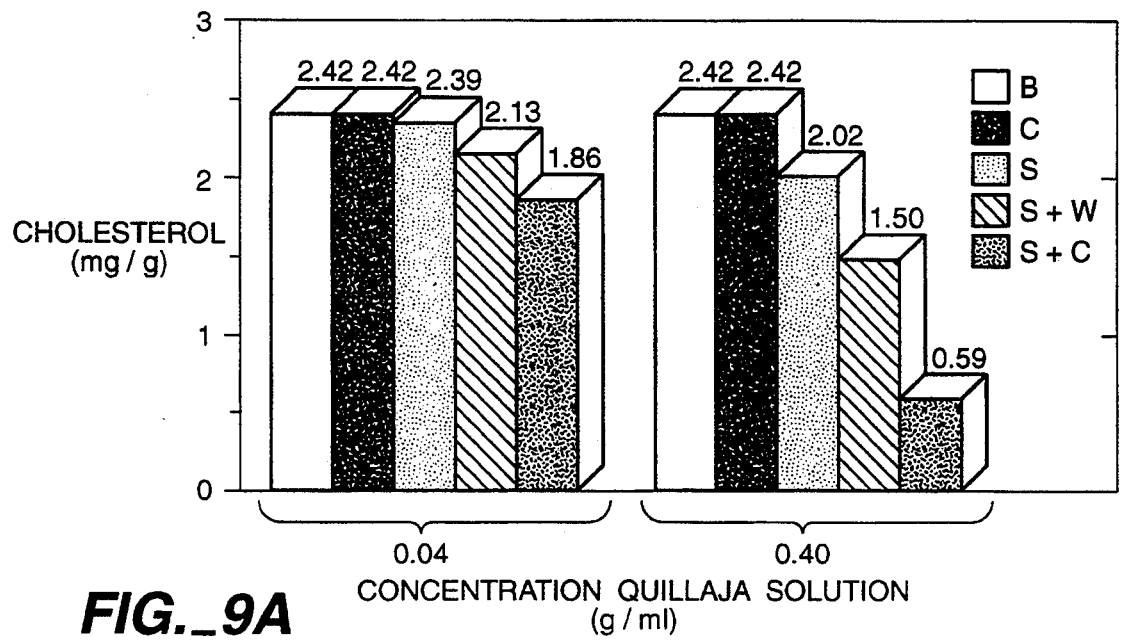
FIG._9A
| SOURCE | DF | MEAN SQUARE | F RATIO | PROB > F |
|---|---|---|---|---|
| PROCESS | 4 | 1.3743 | 171.81 | 0.0001 |
| CONC. QUILL. SOLN. | 1 | 1.2636 | 157.97 | 0.0001 |
| CONC.QUILL. *PROCESS | 4 | 0.3644 | 45.56 | 0.0001 |
FIG._9B
| CONC. QUILLAJA SOLUTION / PROCESS | N | MEAN | GROUPING |
|---|---|---|---|
| 0.04 / PROCESS B | 2 | 2.42 | A |
| 0.04 / PROCESS C | 2 | 2.42 | A |
| 0.04 / PROCESS S | 2 | 2.39 | A |
| 0.04 / PROCESS S + W | 2 | 2.13 | B |
| 0.04 / PROCESS S + C | 2 | 1.86 | C |
| 0.40 / PROCESS B | 2 | 2.42 | A |
| 0.40 / PROCESS C | 2 | 2.42 | A |
| 0.40 / PROCESS S | 6 | 2.02 | B C |
| 0.40 / PROCESS S + W | 4 | 1.50 | D |
| 0.40 / PROCESS S + C | 7 | 0.59 | E |
FIG._9C

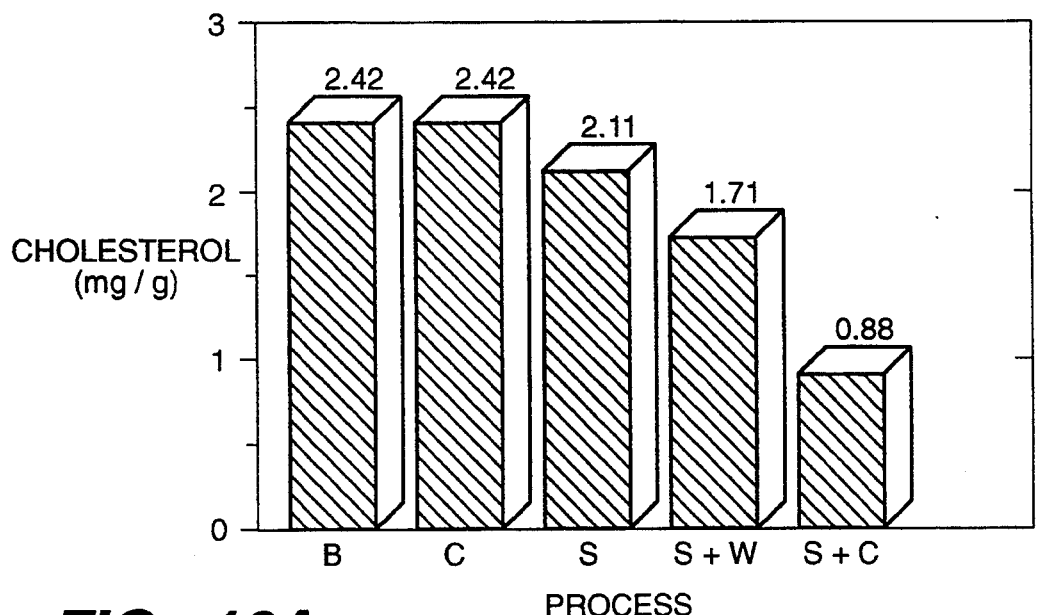
FIG._10A
| SOURCE | DF | MEAN SQUARE | F RATIO | PROB > F |
|---|---|---|---|---|
| PROCESS | 4 | 1.3743 | 171.81 | 0.0001 |
FIG._10B
| PROCESS | N | MEAN | GROUPING | | | |
|---|---|---|---|---|---|---|
| B | 4 | 2.42 | A | | | |
| C | 4 | 2.42 | A | | | |
| S | 8 | 2.11 | | B | | |
| S + W | 6 | 1.71 | | | C | |
| S + C | 9 | 0.88 | | | | D |
FIG._10C

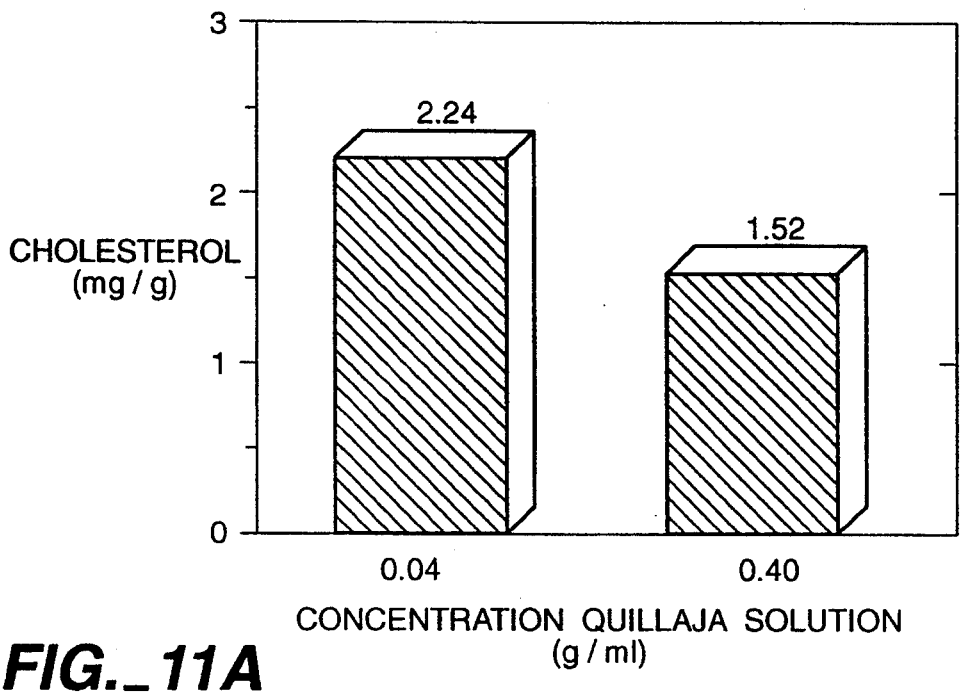
FIG._11A
| SOURCE | DF | MEAN SQUARE | F RATIO | PROB > F |
|---|---|---|---|---|
| CONC. QUILL. SOLN. | 1 | 1.2636 | 157.97 | 0.0001 |
FIG._11B
| CONC. QUILLAJA SOLUTION (g/ml) | N | MEAN | GROUPING |
|---|---|---|---|
| 0.04 | 10 | 2.24 | A |
| 0.40 | 21 | 1.52 | B |
FIG._11C

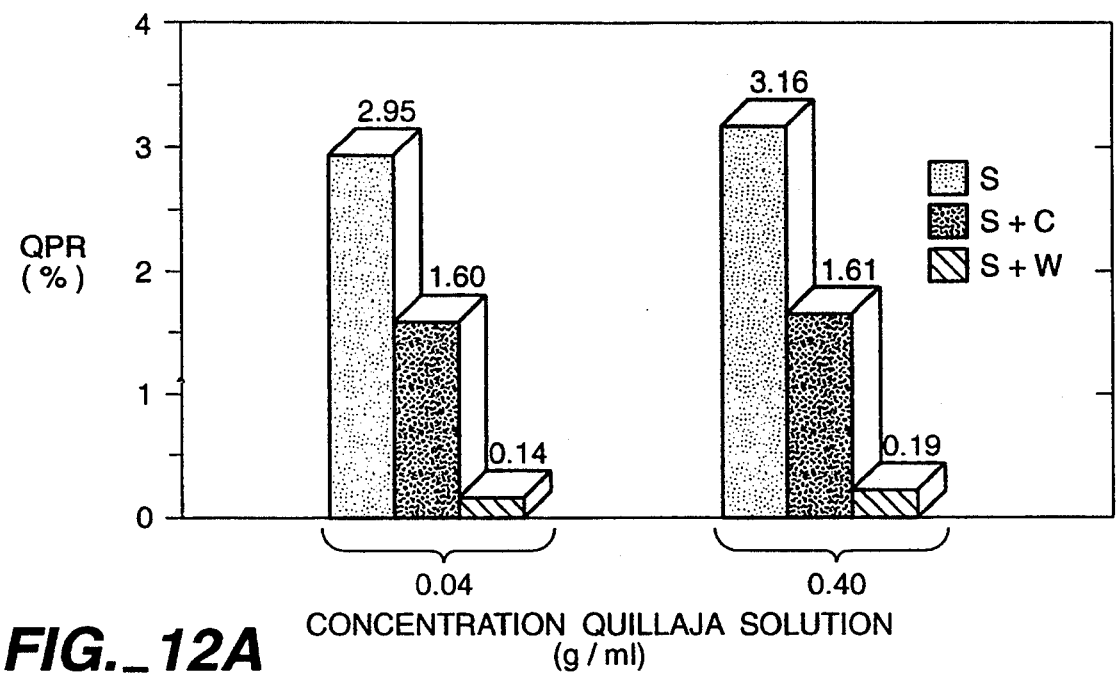
FIG._12A
| SOURCE | DF | MEAN SQUARE | F RATIO | PROB > F |
|---|---|---|---|---|
| PROCESS | 2 | 8.3233 | 33.05 | 0.0006 |
| CONC. QUILL. SOLN. | 1 | 0.0243 | 0.10 | 0.7666 |
| CONC.QUILL. SOLN *PROCESS | 2 | 0.0112 | 0.04 | 0.9568 |
FIG._12B
| CONC. QUILLAJA SOLUTION / PROCESS | N | MEAN | GROUPING | | |
|---|---|---|---|---|---|
| 0.04 / PROCESS S | 2 | 2.95 | A | | |
| 0.04 / PROCESS S + W | 2 | 1.60 | | B | |
| 0.04 / PROCESS S + C | 2 | 0.14 | | | C |
| 0.40 / PROCESS S | 2 | 3.16 | A | | |
| 0.40 / PROCESS S + W | 2 | 1.61 | | B | |
| 0.40 / PROCESS S + C | 2 | 0.19 | | | C |
FIG._12C

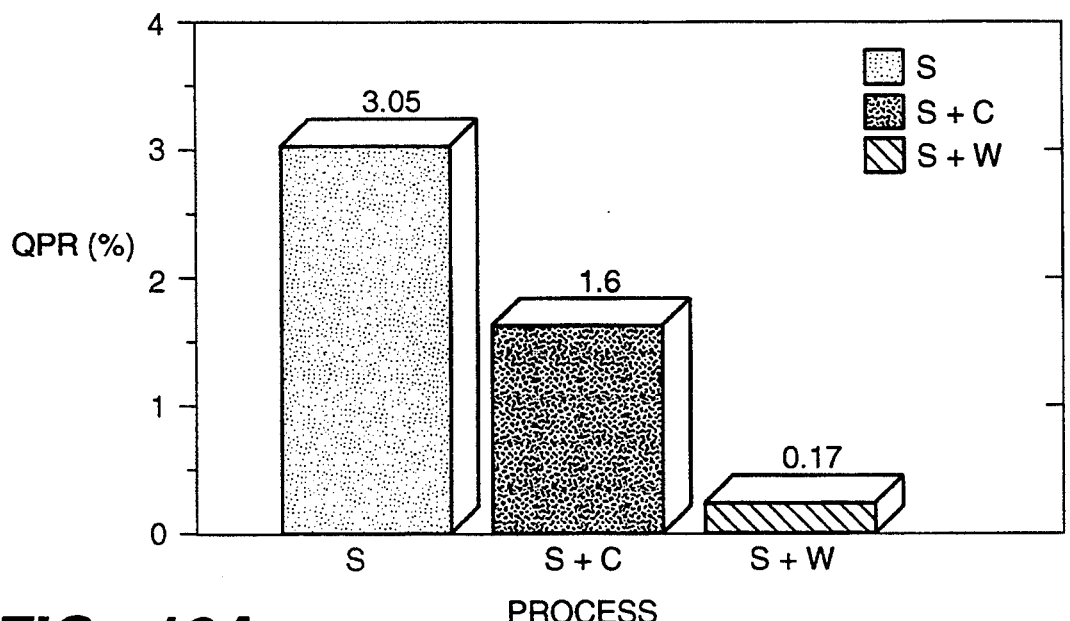
FIG._13A
| SOURCE | DF | MEAN SQUARE | F RATIO | PROB > F |
|---|---|---|---|---|
| PROCESS | 2 | 8.3233 | 33.05 | 0.0006 |
FIG._13B
| PROCESS | N | MEAN | GROUPING | | |
|---|---|---|---|---|---|
| S | 4 | 3.05 | A | | |
| S + W | 4 | 1.60 | | B | |
| S + C | 4 | 0.17 | | | C |
FIG._13C

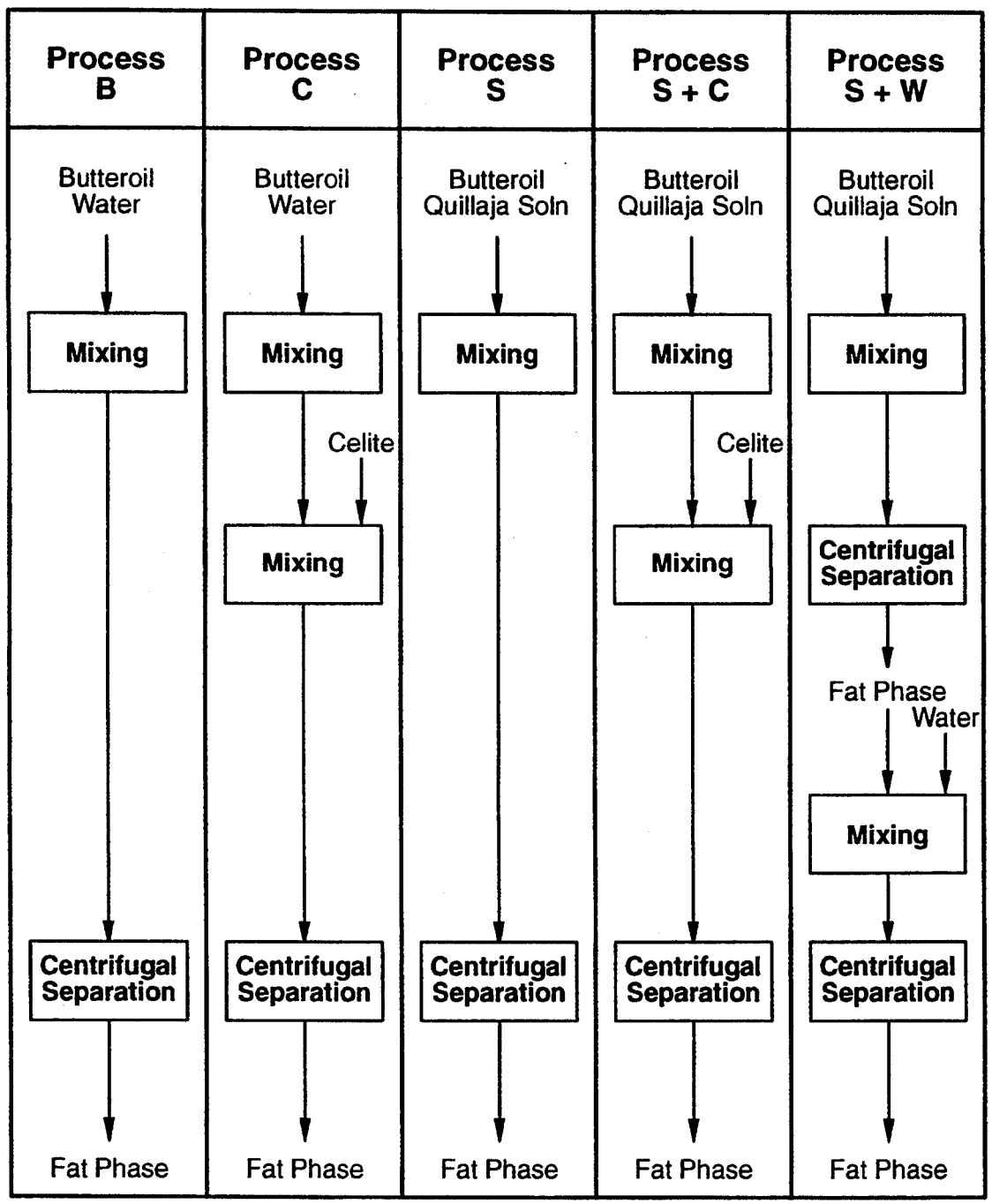
FIG._14

AQUEOUS PROCESS TO REMOVE CHOLESTEROL FROM FOOD PRODUCTS

ORIGIN OF THE INVENTION

This application is a continuation-in-part of U.S. patent application Ser. No. 906,108 filed Jul. 6, 1992, now U.S. Pat. No. 5.326,579 which is incorporated by reference in its entirety.

BACKGROUND OF THE INVENTION

1. Field of the Invention

The present invention relates to a process to remove cholesterol from food or dairy products. More specifically the present invention relates to a process of contacting a dairy product, such as milk, cream or butter oil, with saponins at an elevated temperature, followed by treatment with at least one diatomaceous earth or other adsorbent, and centrifuging, decanting or filtering to remove the insoluble adsorbent containing cholesterol-saponins complex obtained. Alternatively, after contacting a dairy product such as butter or butter oil, with only an aqueous saponin solution at elevated temperature, the aqueous phase containing the cholesterol-saponin complex is removed by centrifugation or decanting, and the resulting fat phase is washed with water, and separated into a cholesterol-reduced fat and an aqueous portion.

2. Description of the Related Art

Cholesterol present in a variety of foods including meat and dairy products has long been implicated as a source of the high levels of cholesterol in humans. Milkfat, for example, usually contains about 310 milligrams total cholesterol per 100 grams (Christie, 1983). Further essentially all of the cholesterol in milk fat is present as free cholesterol with only traces of cholesterol present as an ester.

Therefore, it would be desirable to have an inexpensive large-scale process to remove cholesterol from dairy products ultimately used as foodstuffs.

Some methods are known to remove cholesterol from dairy products. These include, for example, steam stripping, supercritical fluid extraction (SFE) using carbon dioxide, specific enzymatic cholesterol reductase or, adsorption using cyclodextrins. However, these other methods are lengthy, equipment intensive and/or expensive.

The following references are of general and specific interest:

*AOAC Official Methods of Analysis*, 14th Ed. "b-Sitosterol in butter oil." p. 522. Assoc. Off. Anal. Chem., Arlington, Va.

W. W. Christie, (1983). "The composition and structure of milk lipids. p.5 in *Developments in Dairy Chemistry*, Vol. II. Applied Science. New York, N.Y.

A.M. Glaurert, et al, (1962). "Action of saponin on biological cell membranes." *Nature* Vol. 194:953–955.

M. KATES, et al (1972). "Total and free cholesterol." in *Techniques of Lipidology*, P. 360. American Elsevier, New York, N.Y.

I. Katz, et al. (1967). "Rapid method for isolation of unesterified sterols and its application to detection of milkfat adulteration with vegetable oils." *J. Dairy Sci.*, Vol. 50:1764–1768.

K. R. Price, et al. (1987). "The chemistry and biological significance of saponins in foods and feeding stuffs." *CRC Critical Reviews in Food Science and nutrition.* Vol. 26:27–135.

D. P. Schwartz, et al. (1967). "Rapid quantitative procedure for removing cholesterol from butterfat." *J. Lipid Res.* Vol. 8:54–59.

P. Seeman, (1974). "Ultrastructure of membrane lesion in immune lysis, osmotic lysis and drug-induced lysis." *Federal Proceedings*, Vol. 33:2116–21209.

S. Takagi, et al. (1982). "Digitonin-cholesterol complex formation: effects of varying the length of the side chain. *Chem. Phar. Bull.* 30:3485–3491.

D. P. Schwartz, et al., U.S. Pat. No. 3,450,541.

J. Potha, U.S. Pat. No. 4,546,097.

T. E. Furia (ed) (1980) *CRC Handbook of Food Additives* VII, CRC Press, Boca Ratan, Fla.

W. J. Hurst, et al. (1985), "HPLC Determination of the Cholesterol Content of Egg Noodles as an Indicator of Egg Solids," *Journal of Agricultural Food Chemistry*, Vol. 33, pp. 820–822.

J. V. Lagos in Chilean Patent No. 615–91, issued Jul. 3, 1991, describes a process to remove cholesterol from a food stuff using an aqueous solution of saponin followed by microfiltration of the water insoluble cholesterol:saponin complex.

All of the references, patents, standards, etc. cited in this application are incorporated by reference in their entirety.

Saponins are glycosides, occurring primarily but not exclusively, in plants that in general share a number of properties, including, binding of 3-b-OH sterols, marked foaming in water, surfactant properties and hemolysis of red blood cells when aqueous solutions are injected into the bloodstream. Saponins occur widely in plants used for food and feed and have a wide variety of structures which are reflected in their varying chemical and biological properties. In general, the aglycone or non-sugar portion of the molecule is a hydrophobic steroidal or triterpenoidal derivative whereas the polar carbohydrate moiety is comprised of different oligosaccharides of varying chainlength, some being only mono- or disaccharides. The sugars associated with the aglycone may include rhamnose, glucose, galactose, xylose, arabinose, glucuronic acid or mixtures thereof. Coupling of the oligosaccharide to the aglycone can involve hemiacetal linkages between the reducing end of a sugar residue or an ester linkage between the carboxyl group of the glucuronate both linked with a hydroxyl group of the aglycone.

The nature of the cholesterol-glycoside complex is apparently not known with certainty. Based on electron micrographs, Seeman (1974) and Glauret et al. (1962) proposed a micellar type arrangement where three saponin molecules associate via the carbohydrate residues projecting inward. The aglycone on the periphery complexes with cholesterol on an equimolar stoichiometry. More recently Takagi et al (1962) have proposed a structural model for the saponin-cholesterol complex based on studies of the interaction between digitonin and a series of cholesterol analogues. The data of Takagi et al. (1962) are not in agreement or compatible with the structure described by Seeman (1974) and Glauret et al. (1962). The data of Takagi et al. (1982) suggest that the digitonin-cholesterol complex is a clathrate in which digitonin molecules associate to form a hydrophobic pocket in which the cholesterol is a guest. Takagi et al. (1982) proved that the stoichiometry of the cholesterol:digitonin complex is 1:1.

Many, but not all, saponins are fungistatic. Because they can hemolyze red blood cells, saponins are generally toxic when injected intravenously. However, the oral toxicity of many saponins is quite low because they are not absorbed from the gut. There is some evidence that saponins included in feeds at relatively high levels leads to reduced growth rates in poultry and monogastric mammals. Most common saponins of foods and feedstuffs seem to be free of significant oral toxicity. For example, soybean saponins fed at high concentrations to chicks, mice and rats had no adverse effects. Rats fed alfalfa saponins at a level of 1% in the diet for up to 6 months showed no ill effects, although a potentially beneficial reduction in serum cholesterol and triglycerides was observed. In monkeys (primates also known as *Macaca fascicularis*), no adverse effects were observed after the consumption of an undefined mixture of alfalfa top saponins for up to 18 months.

The triterpenoid saponins from a soap bark (also known as *Quillaja saponaria*) are widely used in some countries as food additive (foaming and emulsifying agent) and have been subjected to thorough toxicological tests. No significant toxic effects were observed in short-term feeding studies in rats, nor in mice fed the material at levels as high as 1.5% over a prolonged period. Saponin-containing extracts of a yucca plant (*Yucca mohavensis*) were found to be less hemolytic than those of soybeans. No adverse effects of feeding commercial *Yucca mohavensis* saponin (0.05%) for 12 weeks were noted in rats in respect to growth, food utilization, blood counts, blood glucose and nonprotein N or in gross or histological findings post-mortem.

Retardation of growth by dietary saponins was first observed in chicks fed alfalfa. The effect could be overcome by the addition of 1% cholesterol in the diet; presumably by forming a complex with the saponins in the gut. Growth retardation by dietary saponins has been observed in other avian species and in other monogastric animals (particularly swine) and in laboratory mammals. Isolated saponins from a trefoil (also known as *Medicago lupulina*) and from other genera, such as Quillaja and Gypsophila species have also been shown to cause growth retardation in rodents. Primates appear to be more resistant to the detrimental biological effects of dietary saponins, and some researchers believe that primates may have adapted to saponins in the diet. It would appear that saponins in foods and feeds have a low order of oral toxicity.

A number of researchers have observed that different saponins exert a hypocholesterolemic effect when included in the diet of various animals at non-toxic levels. (See Price et al. (1987)). The effect appears to be more than binding of cholesterol in the gut to prevent its absorption. Evidence has been presented that saponins also increase the fecal excretion of bile acids. Since bile acids are derived from the body's cholesterol this decreases the body burden of cholesterol, thereby lowering serum cholesterol. The hypocholesterolemic effect of saponins has prompted some biomedical researches to propose using foods containing them in serum cholesterol-lowering diets.

Saponins occur in a variety of common foods and feeds as well as herbs and tonics (Price et al., 1987). In Table 1 are listed some foods, herbs, flavorings, health foods, tonics and feeds containing substantial concentrations of saponins.

TABLE 1

SAPONIN SOURCES
Saponins (% where given) in selected foods, herbs, flavorings, health foods, tonics and feeds (See Price, et al., 1987 above).

| PLANT PRODUCT | Saponins, % |
| --- | --- |
| Foods | |
| Soybeans - full fat | 0.22–5.6 dry wt. |
| Protein isolates | 0.3–2.5 dry wt. |
| | 0.76 wet wt. |
| Defatted soy flour | 0.67 wet wt. |
| Fermented soy products | 0.25–0.84 dry wt. |
| Tofu | 0.30–2.1 dry wt. |
| Butter beans | 0.10 dry wt. |
| Kidney beans | 0.2–1.6 dry wt. |
| Navy beans | 0.4–2.1 dry wt. |
| Canned baked beans | 0.45 dry wt. |
| Green pea | 0.18–4.2 dry wt. |
| Peanuts | 0.001–1.6 dry wt. |
| Asparagus | 1.5 dry wt. |
| Garlic | 0.3 dry wt. |
| Alfalfa sprouts | 8.0–8.7 dry wt. |
| Oats | 0.1–0.13 dry wt. |
| Sesame seeds | 0.30 dry wt. |
| Tomato seeds | 1.0 dry wt. |
| Onions | |
| Lentils | |
| Green pepper | |
| Tea | |
| Pumpkins | |
| Melons/Watermelons | |
| Yams | |
| Cucumber | |
| Blackberry | |
| Herbs, Flavorings, Health Foods, Tonics | |
| Aloe | |
| Lemongrass | |
| Sage | |
| Fenugreek | |
| Licorice | |
| Nutmeg | |
| Quillaja | |
| Saponaria | |
| Yucca | |
| Gypsophila | |
| Ginseng | |
| Feeds | |
| Alfalfa | 0.17–1.71 |
| Alfalfa meal | 1.26 |
| Horse chestnut | 3–6 |
| Lupins | 1.1–1.7 |
| Black medic trefoil | 3.5 |

It is apparent from Table 1 that saponins occur in a wide variety of plants, many of them consumed by humans. Also, common animal feeds contain substantial quantities of saponins. *Quillaja saponaria* (soapbark) which contains 10% saponins (Price et al., 1987) and *Yucca mohavenensis* (rich in saponins) are evidently approved in the U.S.A. for use as food additives with no apparent limitations (Furia, 1980). Crude extracts of these sources of saponins are commercially available and relatively low in price.

It is reported that an analytical procedure using toxic benzene solvent is described for the removal and determination of cholesterol in milk-fat using digitonin, which is a known regulated toxic cardiac stimulant for mammals, e.g. human beings. (See D. P. Schwartz et al. (1967)). The use of toxic benzene solvent, plus its difficulties and high cost cannot be applied to foodstuffs.

It would therefore be very valuable to use the less expensive crude extracts of plant saponins (food grade) for the large scale aqueous removal of cholesterol from dairy products which can be used in food-stuffs. The present invention provides such a procedure.

SUMMARY OF THE INVENTION

In one aspect the present invention relates to a process for the removal of cholesterol from a processed or unprocessed food product, which process comprises:
- (a) obtaining a processed or unprocessed food product containing cholesterol and if water is not present adding between about one and 5 fold by weight of water based on the weight of the food product;
- (b) treating the food product or food product: water mixture of step (a) under agitation at a temperature of between about 35° and 80° C. and for between about 0.1 and 16 hours with an amount of non-toxic food grade saponin effective to bind up to about 90% or more of the cholesterol present in the food product;
- (c) separating the aqueous phase containing the cholesterol:saponin complex by mechanical means, e.g. independently selected from centrifugation or decanting, after the prescribed treatment of the dairy product with the non-toxic food grade saponin;
- (d) mixing the food product obtained from step (c) at a temperature of between about 35° and 80° C. with water in about 1 to 5 fold amount by weight of the amount of food product obtained in step (c) for about 0.1 to 2 hours to remove any residues of saponin and cholesterol: saponin complex;
- (e) separating the aqueous phase containing residues of saponin and cholesterol: saponin complex by mechanical means, e.g. by centrifugation or decanting; and
- (f) recovering the food product having a reduced content of cholesterol.

In a preferred embodiment the food product is a dairy product selected from raw cream, pasteurized cream, butter, butteroil or anhydrous milk fat.

In another aspect, the present invention relates to a process for the removal of cholesterol from a cholesterol containing food product, which process comprises:
- (a) obtaining a product containing cholesterol and adding 1 to 5 fold by weight of water of the food product present;
- (b) treating the product or product:water mixture of step (a) under agitation at a temperature of between about 35° and 80° C. with an amount of saponin effective to bind the cholesterol present in the product;
- (c) separating the aqueous phase containing the cholesterol:saponin complex by mechanical means, e.g. by centrifugation or decanting;
- (d) mixing the product obtained from step (c) at a temperature of between 35° and 80° C. with an effective amount of water for about 0.1 to 2 hours to remove any residues of saponin and cholesterol:- saponin complex;
- (e) separating the aqueous phase containing residues of saponin and cholesterol:saponin complex by mechanical means, e.g. by centrifugation or decanting;
- (f) recovering the product having up to or more than 90% cholesterol removed.

In still another embodiment, the present invention relates to a process to remove cholesterol from a dairy product using one saponin or a mixture of saponins. The process includes:
- (a) obtaining a processed or unprocessed dairy product;
- (b) treating the dairy product at a temperature of between about 35° and 80° C. with an amount of non-toxic saponin effective to bind up to about 90% or more of cholesterol present in the dairy product;
- (c) treating, at a temperature between about 35° and 80° C., the dairy product containing the cholesterol:saponin complex with an effective amount of a solid adsorbent; alternatively for butter and butteroil, removing the aqueous phase containing the cholesterol:saponin complex from the saponin-treated fat product by centrifugation;
- (d) separating the insoluble solid adsorbent containing the cholesterol:saponin complex from the liquid by filtration, decanting or centrifugation; alternatively for butter and butteroil, washing the fat phase resulting from step (c) with water; and
- (e) recovering the dairy product having a reduced content of cholesterol which can be ingested by other mammals.

In embodiments for milk or cream, some water is naturally present. For butter or butteroil, in step (b) water a 1 to 10 fold amount based on the total sample weight) is added, and in step (d) the solid adsorbent containing complex is removed by mechanical means, usually by centrifugation, followed by washing the fat with water and separation of the cholesterol-reduced butteroil and aqueous phases, usually by centrifugation In a preferred embodiment, the dairy product is butteroil having a cholesterol concentration of between about 2 to 4 mg/g is contacted with saponin at between about 40° to 65° C., especially at about 40° C.

In another preferred embodiment, the dairy product is milk or cream treated with saponin at 40° to 75° C., especially about 65° C. to remove cholesterol.

Alternatively the present invention relates to a process to remove cholesterol from a dairy product using one saponin or a mixture of saponins. The process includes:
- (a) obtaining a processed or unprocessed dairy product optionally adding water;
- (b) treating the dairy product at a temperature of between about 35° and 75° C. with an amount of non-toxic saponin effective to bind up to about 90% or more of cholesterol present in the dairy product;
- (c) treating, at a temperature between about 35° and 75°, the cholesterol:saponin complex with an effective amount of a solid adsorbent;
- (d) separating the insoluble solid absorbent containing the cholesterol:saponin complex from the liquid by filtration, decanting or centrifugation; and
- (e) recovering the dairy product having a reduced content of cholesterol which can be ingested by other mammals.

In preferred embodiments, the dairy product is butteroil having a cholesterol concentration of between about 0.02 to 0.04 g/ml is contacted with saponin at between about 35° to 55° C., especially at about 40° C.

In another preferred embodiment, the dairy product is milk or cream treated with saponin at 56° to 75° C., especially about 65° C. to remove cholesterol.

BRIEF DESCRIPTION OF THE FIGURES

FIGS. 1 to 7 relate to the removal of cholesterol with adsorbent.

FIG. 1 is a general schematic representation of the process to remove cholesterol with adsorbent.

FIG. 2 is a schematic representation of one embodiment to remove cholesterol from butteroil.

FIG. 3 is a schematic representation of one embodiment to remove cholesterol from whole milk.

FIG. 4 is a graph of the cholesterol level based upon the use of liquid or solid saponin.

FIG. 5 is a composite graph of the removal of cholesterol from milk at 65° C. using the process of the present invention. Untreated whole milk initially shows the presence of about 2.5 mg of cholesterol per gram of fat (composite of 8 experiments). The saponin-treated milk has a level of about 0.25 mg cholesterol per gram of fat (3 exp.).

FIG. 6 is a series of HPLC chromatographs showing the removal of cholesterol from butteroil at 65° C. using saponins.

FIG. 6A is a high pressure liquid chromatogram of a standard control sample of cholesterol.

FIG. 6B is a high pressure liquid chromatogram of a butteroil control sample containing 2.5 mg cholesterol per gram of fat.

FIG. 6C is a high pressure liquid chromatogram of treated butteroil showing 93.4% removal of the cholesterol (to 0.17 mg of cholesterol per gram of fat).

FIG. 7 is a series of HPLC chromatograms showing the removal of cholesterol from cream at 65° C. using different concentrations of saponin per gram of fat present.

FIG. 7A is a high pressure liquid chromatogram of a milkfat from control cream containing 3.7 mg cholesterol per gram of fat.

FIG. 7B is a gas liquid chromatogram of a cream treated with 0.043 g saponin per gram of fat showing 35% removal of cholesterol.

FIG. 7C is a high pressure liquid chromatogram of a cream treated with 0.1 g of saponin per gram of fat showing 65% removal of cholesterol.

FIGS. 8 to 14 relate to the removal of cholesterol without adsorbent

FIG. 7D is a high pressure liquid chromatogram of a control sample of cream treated with 0.04 g of digitonin per gram of fat showing 92% removal of cholesterol.

FIGS. 8 to 14 relate to the removal of cholesterol without adsorbent.

FIG. 8 is a schematic representation of one embodiment to remove cholesterol from butteroil without the addition of adsorbent.

FIGS. 9 to 13 contain the results obtained in Example 6 below for the removal of cholesterol from butteroil without adsorbent.

FIG. 9 is a graphic and tabular representation of the effects of concentration of Quillaja solution and type of process employed on the levels of cholesterol removal for all treatments.

FIG. 10 is a graphic and tabular representation of the effect of the type of process employed on the levels of cholesterol removal, averaged over the two concentrations of Quillaja solution.

FIG. 11 is a graphic and tabular representation of the effect of concentration of Quillaja solution on the levels of cholesterol removal, averaged over all the types of process employed.

FIG. 12 is a graphic and tabular representation of the effects of concentration of Quillaja solution and type of process employed on the levels of Quillaja powder residue (QPR) in the resulting fat phase for all treatments.

FIG. 13 is a graphic and tabular representation of the effect of the type of process employed on the levels of Quillaja powder residue (QPR) in the resulting fat phase, averaged over the two concentrations of Quillaja solution.

FIG. 14 is a graphic representation of the various types of process, performed at laboratory scale as described in Example 6 below, to establish the invention.

DETAILED DESCRIPTION OF THE INVENTION AND PREFERRED EMBODIMENTS

DEFINITIONS

As used herein:

"Butteroil" refers to oil or anhydrous milkfat derived from milk or other dairy product.

"CELITE ™" is a trademark for diatomaceous earth and related products.

"Diatomaceous earth" refers to solid filter aids and adsorbents derived from diatoms and is a form of silicon oxide.

"Pasteurized cream" refers to cream which has undergone the usual pasteurization conditions of heating at 65° C. for 30 minutes.

"Pasteurized milk" refers to milk which has undergone the usual pasteurization conditions of heating at 71.6° C. for about 15 sec.

"Raw cream" refers to cream obtained from raw milk.

"Raw milk" refers to milk as obtained from the lactating mammal.

"Saponin" refers to glycosides occurring primarily, but not exclusively in plants which bind effectively with 3-b-OH sterols.

DESCRIPTION

It is an object of the present invention to provide an improved process for the removal of cholesterol from butteroil, dairy products and other cholesterol containing foods, e.g. eggs, animal fats, shrimp, etc. The human-food grade food (e.g., dairy) product thus obtained has a very low cholesterol level or is essentially cholesterol-free.

In the present invention it has been found that when butteroil is first mixed with a quantity of food grade saponin optionally first washed with a food grade petroleum ether or alkyl ether to remove lipid soluble material, that a cholesterol-saponin complex is formed and the subsequent removal of the cholesterol is about 80 or 90% or higher.

Optionally, a quantity of water 1 to 80 fold, preferably 1 to 30 fold may be added to the food product prior to or during or after the addition of the food-grade saponin.

Next powdered adsorbent, such as diatomaceous earth, e.g., CELITE, is added and mixed.

The solid product (adsorbent "cake" containing the cholesterol-saponin complex) is removed by conventional mechanical means, i.e. centrifugation, decanting or filtration, in either a continuous or a batch manner. One conventional dairy centrifuge useful at a prepilot state model is available from Westfalia Separator A. G. of Oelde, West Germany, or from its American counterpart, Centrico, Inc. located at 3400 Third Avenue, Foster City, Calif. 94404. Larger models for pilot plant and commercial scale separations are also available from Centrico, Inc.

If water is present, it is then removed from butteroil by separation of the nonmiscible phases using mechanical means, typically by centrifugation. A washing step of the fat phase may be included before the final separation of the cholesterol-reduced butteroil.

When the product is butter or butteroil, after the treatment with aqueous solution of saponin, the aqueous phase containing the cholesterol-saponin complex may be separated from the fat phase by centrifugation. Then, the separated fat is washed with water and the washed cholesterol-reduced butter or butteroil is recovered by centrifugation.

The human-food grade food (e.g., dairy) product containing butterfat now has about 70 to 90% or more of its cholesterol removed.

The process of the present invention is exemplified for the removal of cholesterol from a typical butterfat. This process is preferably used for removal of cholesterol from dairy products but it is equally applicable for the separation of naturally occurring (3-b-hydroxy) sterols from any lipid mixture, particularly those subsequently used for a food stuff. These other sterols include ergosterol and zymosterol from fungi, and stigmasterol, spinasterol and other phytosterols from plants.

It is to be understood that although dairy products are a primary focus of the present invention that any cholesterol-containing food may have its cholesterol level reduced according to the present invention. Egg (or egg yolk) can be pureed (liquid eggs) optionally dissolved in an organic solvent and/or water and treated with saponin/adsorbent (CELITE TM). The cholesterol can be separated and the cholesterol-lowered pureed eggs recovered by concentration. In addition marine oils and lard can be treated with saponins to remove cholesterol.

Referring now to the figures, FIG. 1 shows a schematic representation of one embodiment of the removal process using the addition of diatomaceous earth. A dairy product 10 (or other cholesterol containing material, e.g. egg) is contacted with food grade saponin 11 and stirred at a temperature and for a time effective to complex the cholesterol to produce a mixture 12. Diatomaceous earth 13 or other adsorbent 14 is added and agitated. Preferably, water 12A is added when the dairy product is butter or butteroil. About 1 to 80 times by weight is used, preferably water in between about 1 to 10 times the weight of butter or butteroil is used. The insoluble solids 15 (adsorbent containing cholesterol:saponin complex) is separated by mechanical means: decanting, filtration or centrifugation 16. The components of 15 can be further separated for recycle or for sale. The liquid 17 has a reduced cholesterol content and can be converted into subsequent products, e.g. dairy products. The liquid/solid is conveyed by pumps, pipes and the like which are standard equipment in this art.

FIG. 2 shows a schematic representation of the process to remove cholesterol from butteroil using diatomaceous earth. The butteroil (about 300 g) 21 and saponin 22 (about 12 g) are suspended and agitated using agitator 23 in a mixing tank 24 at 40°-80° C. Water 22A (1-80 fold by weight, preferably 1 to 30 fold by weight) is added and this suspension is agitated for ½ to 12 hours (preferably 1 hour) at about 40°-80° C., preferably at 40° C. Because butteroil is not a good medium for pathogens and/or bacteria to grow, this lower process temperature (40° C.) is possible. To the butteroil:saponin:water suspension is added an (diatomaceous earth) adsorbent 25, e.g. CELITE 545 in small quantities between about 0.024 and 0.24 g/g of fat, preferably about 0.24 g/g fat. This mixture is agitated for 0.5 to 12 hr (preferably 1 hour), preferably at about 40° C. The suspension of butteroil:water:saponin: CELITE is pumped using pump 26 to a centrifuge 27 which operates at between about 100 and 10,000 g (preferably 1,000 g) at about 40° C. The insoluble solids 28 (adsorbent containing the cholesterol:saponin complex) are removed. The liquid is pumped using pump 29 and filtered hot through a filter aid (e.g. CELITE) 30 to remove residual solids. The cholesterol reduced butteroil 31 is recovered. Alternatively, to the butteroil:water mixture leaving centrifuge 27 is added additional water as a washing step prior to the final centrifugation 27A where the washed cholesterol-reduced butteroil is obtained.

FIG. 3 is a schematic representation of a general process to remove cholesterol from whole milk (or cream). Whole milk or cream 10A and saponin 10B are combined in a mixing tank 11 at about 65° C. and agitated between about 0.5 to 2 hours, preferably about 1 hour. The product is pumped using pump 31 to a tank 33 where adsorbent 35, e.g. CELITE 545, is added and the suspension agitated for about 0.5 to 2 hours, preferably about 0.5 hour. The solids 36 (adsorbent containing the cholesterol:saponin complex) are separated using mechanical means, e.g. using centrifuge 34, as described above. The cholesterol reduced milk 37 can be used directly or in food products.

FIG. 4 shows the removal of cholesterol from butteroil using different grades of saponin.

FIG. 5 shows the removal of cholesterol from milk. About 80% removal is observed.

FIG. 6 is a series of HPLC chromatographs showing the removal of cholesterol from butteroil at 65° C. using saponins.

FIG. 7 is a series of HPLC chromatograms showing the removal of cholesterol from cream at 65° C. using different concentrations of saponin per gram of fat present.

Aqueous Removal of Cholesterol Without Adsorbent

Referring now to FIG. 8, it shows a schematic representation of one embodiment to remove cholesterol from butteroil without the addition of adsorbent.

Surprisingly in view of the art, it was found that the adsorbent could be omitted from the aqueous process with an aqueous washing of the fat phase resulting in good removal of the cholesterol. This improvement demonstrates that the cholesterol removal is less complex and can be achieved with lowered costs and less capital equipment. In contrast to Chilean Patent No. 615-91 above, the cholesterol:saponin complex is soluble in the water phase. The aqueous and fat phases are separated by centrifugation at between about 5,000 and 40,000 g, (preferably about 16,000 g) decantation or settling.

In a preferred embodiment the food product is selected from pureed egg, dairy products, animal fats, e.g. lard or tallow, marine oils, e.g. fish oil cod liver oil, and the like.

In another preferred embodiment the food product is a dairy product independently selected from raw cream, pasteurized cream, butter, butteroil, anhydrous milk fat combinations thereof and the like.

In still another preferred embodiment, the dairy product to aqueous solution of saponin is combined in ratios between about 0.5/2 to 2/0.5 weight in grams/volume in liter. The ratios herein are weight/weight or weight to volume. After separating the fat phase, it is washed one or more (e.g. 5) times with water, which is present in between about a one to five fold amount of fat to remove saponin residues. Butteroil 20 and an aqueous solution of saponins 21 (between about 0.04 to 0.40 g quillaja powder/ml solution) are mixed together in about 0.5:2 to 2:0.5 (a 1:1 w/v ratio) in a mixing tank 23 provided with a stirrer 22 at a temperature between 40° and 65° C., for about 0.5 to 2 hours. The suspension formed is pumped to a centrifuge 25 where the fat phase 26 and aqueous phase 27 are separated. The fat phase 26 is pumped to a mixing tank 29 provided with stirrer 30 where water 31 (between about 1 to 5 fold by weight of fat present) is added, and the suspension is agitated for between 0.1 to 1 hour at a temperature between about 40° to 65° C. The resulting suspension is then pumped using pump 32 with addition of water 33 to a centrifuge 34 at between about 5,000 to 40,000 g (preferably about 16,000 g) where the aqueous phase 36 and the washed cholesterol-reduced butteroil 35 are separated. A laboratory scale centrifugation was performed at 4° C. However the centrifugation is performed between 35° to 80° C. on a large scale, preferably between 40° and 65° C. The aqueous phases 27 and 36 may be combined for recovery of the saponin solution and separation of cholesterol. The fat phase 26 or the cholesterol-reduced butteroil 35 may be conveyed back (recycled) to the mixing tank 23 for reprocessing if the desired level of cholesterol removal has not been achieved in a single pass.

Removal of Cholesterol from Butter Oil or Milk Fat Using Saponin and Adsorbent (a) The crude saponin extract in powder form is obtained from Penco of Lyndhurst, N.J.

(b) The butteroil is mixed with the saponin solution 10 to 400 mg/ml (preferably about 40 mg/ml) so that a final concentration of between about 10 to 400 mg (preferably about 40 mg) of saponin extract is present per gram of butteroil. This is approximately a 20 fold by weight of saponin relative cholesterol in milkfat. A (suspension) emulsion is formed that has variable viscosity depending upon the concentration of saponin solution, ratio of aqueous solution to butteroil, degree of agitation, and temperature.

(c) The butteroil and aqueous saponin solution are shaken in a standard waterbath shaker at between about 100 and 300 rpm (preferably at 200 rpm) at 35° to 75° C., preferably 40° C., for between about 0.5 to 24 hr, preferably between about 0.5 and 2 hr, most preferably about 1 hr.

(d) To the emulsion is added about 20 to 1000 mg, preferably 100 mg, of CELITE #535 per gram of butteroil. The reaction mixture was maintained with shaking at about 100 to 300 rpm, preferably about 200 rpm at about 35° to 75° C., preferably 40° C., for about 0.5–4 hr, preferably 1 hr.

(e) The emulsion is filtered through a CELITE 560 filter cake at about 40° to 75° C. preferably 50°–55° C., most preferably 52° C. The temperature is increased because of the higher viscosity of the butteroil at lower temperatures. Alternatively, the insoluble adsorbent containing the saponin-cholesterol complex is separated by centrifugation at the temperature prevailing during step (d).

(f) The filtrate or liquid phase resulting from centrifugation is allowed to separate at 40° C., preferably into two liquid phases (oil/water), and the purified butteroil is collected. Alternatively, centrifugal separation may be employed to separate the purified butteroil.

(g) A small (0.1 g) portion of fat is removed to determine the level of cholesterol remaining in the butteroil using the high pressure liquid chromatography procedure of W. J. Hurst, et al. as described herein.

Removal of Cholesterol from Cream or Milk (With Adsorbent)

(a) The milk or cream is mixed with the food grade saponin extract (a dry powder is preferred) using about 10 to 100 mg (preferably 40 mg) of saponin per gram of fat in the milk or cream.

(b) The saponin-milk mixture is shaken (250 rpm) in a shaker waterbath at 56° to 75° C. (preferably 65° C.) for 1-24 hours, preferably 2 hr.

(c) CELITE #545 (Manville Corp., Denver, Colo.) is added to the shaker flask (100 mg of CELITE per gram of fat in the milk) and shaken at 250 rpm for 1 hr.

(d) The reaction mixture is filtered through a CELITE #560 filter cake (about $\frac{1}{4}$ inch thick) at 65° C.

(e) At this point, the filtered milk is collected, and cholesterol determined according to the HPLC procedure of W. J. Hurst et al. above, which is incorporated herein by reference.

In one embodiment, butteroil is treated according to all steps of the claimed process at between about 35° and 50° C., preferably about 40° C.

In another embodiment, raw milk, pasteurized milk, raw cream, and pasteurized cream are treated according to all steps of the claimed process at between about 56° and 75° C. It is also preferred that the milk not be homogenized.

In one embodiment, the saponin extract from Quillaja at 40 mg per gram of butterfat in milk are combined. This mixture is shaken at 200 rpm at 65° C.±1° C. for 2 hr. Next, the mixture is treated with 25 g of CELITE #560 at 65° C.±1° C. for 1 hr. with shaking at 200 rpm. The milk is then filtered hot at 65° C. through a filter cake of CELITE 560. The milk thus treated has the level of cholesterol lowered to about 25% by weight of the cholesterol originally found in the milk.

The following Examples are presented to be descriptive and illustrative only. They are not to be construed as being limiting in any way.

MATERIALS AND EQUIPMENT

Gyrotary waterbath Shaker, Model G76, New Brunswick Scientific, Edison, N.J.

Varian High Pressure Liquid Chromatograph model 5020. 2700 Mitchell Drive, Walnut Creek, Calif. 94598. Column ALTECH #28024 VERSAPACK C1810U—250 mm and under diameter of 4.1 mm. The eluent is 1% isopropanol/hexane which is stored under a nitrogen atmosphere.

The CELITE used in the present invention is diatomaceous earth available from the Manville Corp., Denver, Colo., in a number of useful grades. CELITE 560 and CELITE 545 are preferred in the present invention.

EXAMPLE 1

Removal of Cholesterol with Saponin and Adsorbent (a) Quillaja, 0.6 g (prewashed with 2×100 ml portions of diethylether) was added to each of six comparable samples (B to G) of milk and are as follows:
   A. Control—No saponin
   B. Homogenized milk, 37° C., plus 1 ml $NaN_3$
   C. Non-homogenized milk, 37° C., plus 1 ml $NaN_3$
   D. Homogenized, 4° C.
   E. Non-homogenized, 4° C.
   F. Cream, 37° C., 1 ml $NaN_3$
   G. Cream, 4° C.

(b) Samples A to G were agitated 4 hr using a shaker (250 rpm) at the temperatures cited.

(c) CELITE #545 (e.g., from Manville), (2 g) was added to each sample.

(d) Each sample was again agitated for one hour at their respective temperatures given above.

(e) Milk samples A, B, C, D, E, F and G were heated to 72° C. for 5 min.

(f) Each sample was then filtered through a CELITE #545 filter cake and collected in a 50 ml screw-cap test tube.

(g) These treated dairy product samples were then analyzed for cholesterol according to Example 2.

EXAMPLE 2

Cholesterol Determination (a) 0.1 Gram of treated butteroil from 9 ml of milk or cream were saponified for subsequent cholesterol analysis as in (b);

(b) Each sample was placed in a test tube with 5 ml of 2N methanoic KOH to saponify;

(c) The saponification was continued overnight (12 hr) in a 65° C. water bath.

(d) Each sample and tube was cooled to ambient temperature (about 20° C.).

(e) To each tube was added 5 ml of water and 1 ml of 10% sodium chloride solution.

(f) Each sample was then extracted with 2×10 ml of petroleum ether/diethyl ether (1/1:v/v). The aqueous phases were discarded.

(g) The two organic extracts were combined together and evaporated using a nitrogen stream coupled with gentle heating from a hot water bath.

(h) The residue was resuspended in 20 ml of petroleum ether.

(i) 10 ml of the organic phase is passed through a silicon SEP-PAC C-18 Waters Associates, Medford, Mass., and the effluent was discarded.

(j) The SEP-PAC was washed with 10 ml of 7% ethyl ether-petroleum ether which was discarded. The SEP-PAC is then eluted with 75% ethyl ether-petroleum ether. The eluate is collected in 15 ml test tube.

(k) The organic solvents were evaporated under nitrogen stream using gentle heat from a hot water bath.

(l) The solid was resuspended with 2 ml of HPLC mobile phase hexane:isopropanol, 99.9:0.1 v/v.

(m) Each sample was then ready for (HPLC) analysis for cholesterol according to the method of Hurst, et al. Some results are shown in FIGS. 6 and 7.

FIG. 6 is a series of HPLC chromatographs showing the removal of cholesterol from butteroil at 65° C. using saponins.

FIG. 6A is a high pressure liquid chromatogram of a standard control sample of cholesterol.

FIG. 6B is a high pressure liquid chromatogram of a butteroil control sample containing 2.5 mg cholesterol per gram of fat.

FIG. 6C is a high pressure liquid chromatogram of treated butteroil showing 93.4% removal of the cholesterol (to 0.17 mg of cholesterol per gram of fat).

FIG. 7 is a series of HPLC chromatograms showing the removal of cholesterol from cream at 65° C. using different concentrations of saponin per gram of fat present.

FIG. 7A is a high pressure liquid chromatogram of a milkfat from control cream containing 3.7 mg cholesterol per gram of fat.

FIG. 7B is a gas liquid chromatogram of a cream treated with 0.043 g saponin per gram of fat showing 35% removal of cholesterol.

FIG. 7C is a high pressure liquid chromatogram of a cream treated with 0.1 g of saponin per gram of fat showing 65% removal of cholesterol.

FIG. 7D is a high pressure liquid chromatogram of a control sample of cream treated with 0.04 g of digitonin per gram of fat showing 92% removal of cholesterol.

EXPERIMENTAL PROCEDURES

EXAMPLE 3

Removal of Cholesterol from Butter Oil or Milk Fat (with Adsorbent Present)

(a) The crude saponin from the supplier (about 0.6 g) was extracted twice with about 100 ml of diethylether. The ether is removed from the extract by drying under vacuum.

(b) The butteroil is mixed with the washed saponin solution 45 mg/ml so that a final concentration of 40 mg of saponin extract is present per gram of butteroil. An emulsion is formed that has viscosity and appearance of mayonnaise at 20° C. or cold heavy whipped cream.

(c) The butteroil and aqueous solution are shaken in a standard waterbath shaker at 200 rpm at 40° C. for 12 hr.

(d) To the emulsion was added about 100 mg of CELITE #535 (per gram of butteroil). The reaction mixture was maintained with shaking at about 200 rpm at about 40° C. for about 2 hr.

(e) The emulsion was filtered through a CELITE 560 filter cake at about 52° C. The temperature is increased because of the higher viscosity of the butteroil at lower temperatures.

(f) The filtrate is allowed to separate at 40° C. into two phases, and the purified butter fat is collected.

(g) A portion is removed to determine the level of cholesterol remaining in the butteroil using the high pressure liquid chromatography procedure of W. J. Hurst, et al. as described in the methods.

EXAMPLE 4

Removal of Cholesterol from Butter Prepilot Plant Experiments Using Saponin and Adsorbent (a) Butter (300 g) from Dairymans Cooperative, 400 South M Street, Tulare, Calif. 93274, is added to a stirred tank. This stirrer was constructed so that vortices during stirring were avoided. In the experiments, shown in Table A below, the tank was a water jacketed temperature-controlled PLEXIGLAS cylinder having an open chamber of about 17 cm in height and 6.8 cm interior diameter. Within the chamber there is a removable baffle system having 4 equally spaced (0°, 90°, 180°, 270°) baffles with the height of the cylinder and about 0.8 cm width located on the inner curved surface of the chamber, parallel to the axis of the cylinder. The baffles vary in dimension depending upon the amount of agitation desired. Solid saponin (12 g) as a fine powder is added over 2–5 min. The mixture is then mixed using a conventional impeller stirrer at 50 rpm for 60 min. at 40° C. An emulsion is formed. This emulsion (26 or 260 gm) is added to water (1740 to 1974 g) containing powdered CELITE 545 (6 or 60 g) available from Manville Corp. of Denver, Colo. This mixture is then stirred rapidly at 435 rpm for 10 to 60 min. at 40° to 80° C. A three phase system of oil, water and solids is produced. The mixture is then transferred batchwise or continuously to a clarifier/separator prepilot scale centrifuge from Westfalia Separator A G, P.O. Box 3720, 4740 Oelde, W. Germany, or Centrico, Inc. 3400 Third Avenue, Foster City, Calif. 94404, type TA 05-00-105. The mixture is clarified by centrifugation at 8000 rpm, 40°–80°_C. to remove the solids. The centrifuge equipment is then converted to a liquids separator by changing the centrifuge bowl and the butteroil and water are separated at 13700 rpm at 65°–80° C.

More then 80% of the cholesterol is removed from the butteroil. The specific reaction conditions are shown in Table A.

TABLE A

| | CHOLESTEROL REMOVAL FROM BUTTEROIL | | | | | | |
|---|---|---|---|---|---|---|---|
| Exp. | Cholesterol mg/g/fat | % Removal from 3 mg/g | Temp. °C. | Celite g/batch | Water g/batch | Emulsion g/batch | Water pH |
| 1 | 2.70 | 10.00 | 80 | 60 | 1740 | 260 | 7 |
| 2 | 2.42 | 19.33 | 80 | 6 | 1740 | 260 | 9 |
| 3 | 0.60 | 80.00 | 40 | 6 | 1974 | 26 | 9 |
| 4 | 0.56 | 81.33 | 80 | 6 | 1740 | 260 | 7 |

EXAMPLE 4A

Removal of Cholesterol from Cream or Milk Using Saponin and Adsorbent (a) The saponin crude extract is extracted with diethylether (two-100 ml extractions per about 0.6 g of crude extract). The ether is removed by drying.

(b) The milk or cream is mixed with the saponin extract (a dry powder is preferred) using about 40 mg of saponin per gram of fat in the milk or cream.

(c) The saponin-milk mixture is shaken (250 rpm) in a shaker waterbath at 65° C. for 2 hr.

(d) CELITE #545 (Manville Corp., Denver, Colo.) is added to the shaker flask (100 mg of CELITE per gram of fat in the milk) and shaken at 250 rpm for 1 hr.

(e) The reaction mixture is filtered through a CELITE #560 filter cake (about ¼ inch thick) at 65° C.

(f) The filtered milk is collected and cholesterol in the fat determined according to the HPLC procedure of W. J. Hurst et al. (above) which is incorporated herein by reference.

Usually the removal of cholesterol from dairy product using the process of the present invention is between about 60 and 100%. 3-b-Cholesterol esters present in the dairy product which do not complex with the saponin are not removed. Usually, the removal of cholesterol in one separation is about 90% or better, often to 95% or greater. If a lower amount of cholesterol in dairy product is desired, multiple treatment with saponin and CELITE can be performed.

EXAMPLE 5

Removal of Cholesterol from Milk or Cream Using Saponin and Adsorbent

Milk samples used had a cholesterol concentration from between 2.04 and 2.56 mg of cholesterol per gram of milk fat.

General procedure for milk samples a) The milk sample (about 200 g having about 3.5% fat) was agitated at 65° C. with food grade solid powdered saponin (from Penco of Lyndhurst Corp.) at 0.2 gram per gram of fat. Next the sample was filtered hot at 60°–65° C. through 1–2 g of CELITE 545 filter cake.

The milk samples (unpasteurized non homogenized raw whole) were analyzed for cholesterol. The results for specific samples are found in Table B below.

TABLE B

| | CHOLESTEROL REMOVAL | | |
|---|---|---|---|
| Sample | Control Concentration | Treated Sample Concentration | Percent Cholesterol Removal |
| 1 | 2.56 mg/g | 0.43 mg/g | 83% |
| 2 | 2.56 | 0.53 | 79 |
| 3 | 2.43 | 0.82 | 66 |
| 4 | 2.52 | 0.52 | 79 |

General Procedure for Removal of Cholesterol from Cream Samples (b) The cream sample unpasteurized, nonhomogenized, raw cream, (about 50 g) having about 40% fat was agitated with food grade solid powdered saponin (0.1 gram per gram of fat, from Penco of Lyndhurst Corporation of 540 New York Avenue, Lyndhurst, N.J. 07071).

The mixture was agitated using a conventional rotary shaker for 1 hour at 65° C. The hot product was filtered hot through a CELITE 545 filter cake (1–2 g). The results for specific samples are shown in Table C.

TABLE C

| | CHOLESTEROL REMOVAL | | |
|---|---|---|---|
| Sample | Control Concentration | Treated Sample Concentration | Percent Cholesterol Removal |
| 1 | 1.50 mg/g | 0.58 mg/g | 61% |
| 2 | 1.62 | 0.72 | 56 |
| 3 | 2.28 | 0.52 | 66 |

Cholesterol Analysis in Milk and Cream (d) CELITE filtered samples are collected into 50 ml screw cap test tubes.

The milk or cream sample is centrifuged at 10,000 g for 15 min. at 4° C. to collect a plastic cream layer which is about 90% fat.

Three grams of the plastic cream is placed in a conical test tube to which 1 ml H$_2$O and 100 microliters TERGITOL 7 of Sigma Chemical, St. Louis, Mo. 63178, was added.

This mixture was heated to 100° C. for 45 min and then centrifuged at 1700× g for 5 min to collect pure butteroil.

Of this butteroil 0.1 g was removed and analyzed for cholesterol as described above.

EXAMPLE 6

Removal of Cholesterol from Butteroil Using Saponin without Adsorbent Materials Present Anhydrous butteroil were obtained from California Cooperative Creamery, Hughson, Calif. The saponin source was quillaja powder acquired from Penco of Lyndhurst Inc., Lyndhurst, N.J. The product's identifying name was "Powdered Extract (P.E.) Quillaia Low Dust", product code #20230252. The diatomaceous earth used in all the experiments was CELITE 545 provided by Manville of Pleasanton, Calif.

Experimental Protocol

Four (4) alternative processes aiming at cholesterol removal from butteroil were tested, namely:
1) treatment with Saponin only (S),
2) treatment with CELITE only (C),
3) treatment with Saponin followed by treatment with CELITE 545 (S+C), and
4) treatment with Saponin followed by separation of the fat phase and only washing it with water (S+W) without the use of an adsorbent.

The typical experiment for each treatment contained five types of samples. One was a blank and each of the four remaining treatments represented a different process.

The laboratory scale processes are detailed as follows:

BLANK (B):

(a) Fifty gram samples of solid anhydrous butter oil were placed into 250 ml Erlenmeyer and two 0.5 inch glass marbles were added to each flask at ambient temperature.

(b) The flask contents were heated to 55° C.

(c) Fifty ml of deionized water already heated to 55° C. were added to each flask.

(d) The flasks were then incubated in a shaker bath (Girotory Water Bath Shaker model G-76, New Brunswick Scientific Co. Inc., Edison, N.J.) at a temperature of 55° C., at a medium level of agitation for 60 minutes.

(e) The shaker was then stopped, the marbles removed and the emulsion poured into a 250 ml centrifuge bottle.

(f) The centrifugation was carried out in a refrigerated centrifuge (rotor # GSA, Sorvall RC-5B Refrigerated Superspeed Centrifuge, Du Pont Instruments, Wilmington, Del.) for 30 minutes at 4° C. and 10,000 rpm (equivalent to a relative centrifugal force of 16,000 g).

(g) The top fat phase (as a solid) was removed and drained using adsorbent paper.

(h) The thin emulsion layer existing between the fat and aqueous phase was removed and discarded.

(i) The fat phase sample was stored in air tight containers at −20° C. for further analyses.

TREATMENT WITH DIATOMACEOUS EARTH (CELITE) ONLY (C):

Steps (a) to (d) are the same as for the BLANK (B).

(e) Add directly to the flasks 12.5 g of CELITE 545 and continue the incubation in the shaker bath at 55° C. at medium level of agitation for 60 min.

Then steps (e) to (i) are repeated as for the BLANK (B) above.

TREATMENT WITH SAPONIN ONLY (S):

Steps (a) and (b) are the same as for the BLANK.

(c) was repeated as for the BLANK, but substituting the deionized water with fifty ml of saponin solution at a concentration of either 0.04 or 0.40 g quillaja powder/ml aqueous solution.

Then, followed by steps (d) to (i) which are the same as for the BLANK.

TREATMENT WITH SAPONIN, SEPARATION OF FAT, AND WASHING THE FAT WITH WATER (S+W):

Steps (a) to (h) are the same as for the TREATMENT WITH SAPONIN ONLY (S)

(i) The fat phase harvested in step (h) was placed into 250 ml Erlenmeyer flask, two 0.5 inch glass marbles were added and the flask contents were brought up to 55° C.

j) Fifty ml of deionized water already heated to 55° C. were added to each flask.

k) The flasks were then incubated in the shaker bath at 55° C. at a medium level of agitation for 60 minutes.

Next, steps (e) to (i) were repeated as described for the BLANK.

TREATMENT WITH SAPONIN FOLLOWED BY TREATMENT WITH CELITE 545 (s+c):

Steps (a) to (d) were repeated as described for the treatment with saponin only (S).

(e) Add directly to the flasks 12.5 g of CELITE 545 and continue the incubation in the shaker bath at 55° C. at a medium level of agitation for 60 minutes.

Then, steps (e) to (i) are repeated as described for the BLANK.

Statistical Design of Experiments

The factors studied (independent variables) were:
1. Process, studied at five (5) levels:
    Blank (B),
    Treatment with Celite only (C),
    Treatment with Saponin only (s),
    Treatment with Saponin followed by treatment with Celite 545 (S+C), and
    Treatment with Saponin followed by separation of the fat phase and washing it with water (S+W).
2. Concentration of quillaja solution (CQS), studied at two levels:
    0.04 g quillaja powder/ml solution, and
    0.40 g quillaja powder/ml solution The dependent variables were cholesterol and quillaja powder residue (QPR) contents in the fat phase resulting from the different treatments.

Analysis of variance (ANOVA) model I (fixed effects) was used for studying the relation between the dependent variables and the factors process and concentration of quillaja solution (CQS) as shown in Table D.

Duncan's multiple range test was used for the multiple comparison of factor level means and treatment means. ANOVA was performed using the General Linear Models Procedure of the SAS® statistical package, version 6.06.01 (SAS Institute Inc., Cary, N.C., USA) running on a VAX model 8600 computer. Duncan's multiple range test was done using the same software.

Methods (a) Preparation of saponin solutions.—The saponin solutions were prepared with concentrations of 0.04 and 0.40 g of quillaja powder/ml final solution. Fresh solutions were prepared daily as needed for the scheduled experiments. Deionized water with pH corrected to 7.0 with 0.1N NaOH was used in the preparation of all the solutions.

(b) Cholesterol Determination.—The cholesterol content of butteroil and fat phase samples is determined by a three-step procedure involving saponification of the lipids, isolation of the unsaponifiable fraction, and quantitative determination of cholesterol in the unsaponifiable fraction by GLC.

Butteroil and fat phase samples are unfrozen and soften at room temperature, mixed well, and accurately weighed (ca. 0.2 g) directly into 50 ml screw cap test tube. Then 10.0 ml of 2N KOH-MeOH is added, the tube is closed tightly and placed in boiling water for 1 hr.

The unsaponifiable fraction is obtained by extracting the soap solution with ether. The ether extract is washed alternating with 0.5N KOH and water. The final washing is done with portions of $H_2O$ until no longer alkaline to phenolphthalein. The washed ether extract is evaporated to about 5 ml and transferred quantitatively to a test tube. There the ether is evaporated, acetone added, and heated to dryness on a water bath.

The unsaponifiable fraction is then resuspended accurately in 2.0 ml of GC grade hexane, 2.0 ml of internal control solution (0.20 mg 5a-cholestane/ml hexane) is added, and cholesterol determined by GLC.

(c) Quillaja Powder Residue (QPR) Determination.—The objective is to provide an estimate of the amount of residue from quillaja powder left in the fat phases by the different processes.

Quantitatively weigh about 1.0 g of fat phase sample (W1) in a large screw cap test tube. Dissolve sample with 10 ml of ethyl ether. Weigh Whatman #1 fluted filter paper that has been dried until constant (W2) and pass ether suspensions through the filter paper. Rinse the tube two times with 10 ml of ether and pass sample through filter. Wash filter paper twice with 10 ml of ether, combine and discard ether extracts.

Allow the solvent to evaporate from filter paper (preferably overnight at ambient temperature) and then dry it in vacuum oven until constant weight (W3). Calculate the percentage of ether insoluble residue (%EIR) in the sample by:

$$\% EIR = \frac{W3 - W2}{W1} \times 100$$

The results of six replicate determinations of EIR in butteroil, quillaja powder, and fat phase samples using this method are shown in Table E. Thus, the values of % EIR determined by the method will include most of the components from quillaja powder (about 96%) and also a fraction of butteroil components (about 4%).

An estimate of the amount of residue from quillaja powder in the fat phases samples based on the % EIR must then take into consideration the fraction of ether insoluble residue that actually is accounted for by butteroil components.

An estimate will be calculated by the following:

$$\%QPR = \%EIR - 3.95$$

Results

The results of the statistical analysis on the levels of cholesterol removal are summarized in FIGS. 9, 10, and 11. These Figures indicate that:

TABLE D

ANOVA: Experiments for dependent variable Cholesterol and Quillaja Powder Residue (QPR) content in fat phase

| ANOVA model | Factor 1 | Factor 2 |
|---|---|---|
| 2-factor fixed effects | Process (5 levels: B,C,S,S+W,S+C) | Conc. Quillaja Solution (2 levels: 0.04 & 0.40 g/ml) |

TABLE E

Ether Insoluble Residue (EIR) Determination

| Sample | EIR (%) | Mean | Std. Error Mean |
|---|---|---|---|
| Butteroil | 4.02 | 3.95 | 0.18 |
| | 3.80 | | |
| | 3.36 | | |
| | 4.45 | | |
| | 4.41 | | |
| | 3.63 | | |
| Quillaja Powder | 97.56 | 95.58 | 0.84 |
| | 97.20 | | |
| | 94.63 | | |
| | 92.91 | | |
| | 97.42 | | |
| | 93.74 | | |
| Fat Phase | 9.58 | 7.28 | 0.54 |
| | 7.34 | | |
| | 5.64 | | |
| | 7.25 | | |
| | 7.45 | | |
| | 6.39 | | |

1. The treatment with saponin followed by treatment with CELITE 545 (S+C process) and the treatment with saponin followed by separation of the fat phase and washing it with water (S+W process) both significantly reduce the cholesterol content as compared to the Blank process (B).
2. The order of increasing cholesterol removal for the different processes under the conditions studied is given by: S+C>S+W>S.
3. At 0.40 g quillaja powder/ml solution even the treatment with saponin only (S process) yields a significant cholesterol removal over the Blank process (B).
4. Increasing the concentration of saponin solution results in increased levels of cholesterol removal.

The results of the statistical analysis on the levels of quillaja powder residue in the resulting fat phases are summarized in FIGS. 12 and 13. These Figures indicate that:

1. Significant amounts of quillaja powder residue (QPR) are present in the fat phase after the treatment with saponin (S process).
2. The treatment with saponin followed by treatment with Celite 545 (S+C process) and the treatment with saponin followed by separation of the fat phase and washing it with water (S+W process) both significantly reduce the levels of quillaja powder residue (QPR) in the fat.
3. The S+W process resulted in lower quillaja powder residue (QPR) contents in the fat phase when compared to the S+C process and thus washing the fat phase is an effective way of removing QPR from fat phases resulting from the cholesterol removing process.

Specific Embodiments Using Adsorbent

AA One embodiment is a process for the removal of cholesterol from a processed or unprocessed dairy product, which process comprises:

(a) obtaining a processed or unprocessed dairy product containing cholesterol;

(b) treating the dairy product at a temperature of between about 35° and 80° C. with an amount of non-toxic food grade saponin effective to bind up to about 90% or more of the cholesterol present in the dairy product;

(c) treating the product of step (b) at a temperature of between about 35° and 80° C. the with an effective amount of diatomaceous earth or other adsorbent;

(d) separating the insoluble adsorbent containing the cholesterol: saponin complex by mechanical means, e.g. by decanting, filtration, or centrifugation; and (e) recovering the dairy product having a reduced content of cholesterol.

Other embodiments include:

BB The process of AA wherein the dairy product is selected from raw milk, pasteurized milk, raw cream, pasteurized cream, buttermilk, butteroil or anhydrous milk fat.

CC The process of BB wherein the dairy product is butter or butteroil and the process of steps (b) to (e) is performed at between about 40° and 65° C.

DD The process of CC wherein:

in step (b) the saponin is present in the aqueous solution at a concentration up to 0.40 g quillaja powder/ml solution and the time of contact is between about 0.5 and 16 hours;

in step (c) the temperature is between about 40° and 50° C. and the adsorbent is selected from CELITE, silica, alumina, aluminum oxide or bentonite; and in step (d) the insoluble adsorbent containing the cholesterol: saponin complex is removed by mechanical means, e.g. by filtration, decanting, centrifugation, and alike;

in step (e) additional water is added to wash the butter or butteroil free of any saponin residue;

steps (a) to (d) are repeated until the desired level of cholesterol removal is achieved.

EE The process of DD wherein:

in step (b) the saponin is prewashed with an organic solvent to remove some organic soluble materials and the saponin is obtained from Quillaja or Yucca plants and is of food grade quality, and in step (c) the adsorbent is CELITE #535.

FF The process of EE wherein the food product is butter or butteroil and in step (b) water is added in between about 1 to 80 fold by weight excess of the butter or butteroil, and the butter or butteroil/water/adsorbent suspension is first separated of solids and subsequently from the water using centrifuges, with or without the addition of water as a washing step prior to the final separation of the washed cholesterol-reduced butter or butteroil.

GG The process of AA which further includes:

the repetition of steps (a) to (d) until the desired level of cholesterol reduction is achieved followed by step (e).

step (f) separating the adsorbent containing the cholesterol:saponin complex, partially or totally, into its three components, namely adsorbent, cholesterol, and saponin.

HH The process of BB wherein the dairy product is selected from raw milk, pasteurized milk, raw cream or pasteurized cream.

II The process of HH wherein the mixing in steps (b) and (c) is at about 40° C. and the adsorbent is CELITE #545, and in step (d) the cholesterol:saponin complex is separated from the dairy product using filtration through CELITE 560 at between about 55° and 60° C.

JJ The process of AA wherein the removal of cholesterol from butter or butteroil is performed at about 40° C., and removal of cholesterol from milk or cream is performed at about 65° C.

KK A process for the removal of cholesterol from a cholesterol containing product, which process comprises:

(a) obtaining a product containing cholesterol;

(b) treating the product at a temperature of between about 35° and 80° C. with an amount of saponin effective to bind the cholesterol present in the product;

(c) treating at a temperature of between about 35° and 80° C. the product of step (b) above with an effective amount of diatomaceous earth or other adsorbent;

(d) separating the insoluble diatomaceous earth or other adsorbent containing the cholesterol:saponin complex by sedimentation, filtration, or centrifugation; and (e) recovering the product having up to or more than 90% cholesterol removed.

LL The process of KK wherein the product is selected from dairy products, marine oils, lard, animal fats, or egg.

MM The process of LL wherein the process of steps (b) to (e) is performed at between about 35° and 80° C.

NN The process of MM wherein:

in step (b) the saponin is present in about 20 fold excess of the cholesterol present and the time of contact is between about 0.5 and 16 hours;

in step (c) the temperature is between about 35° and 50° C. and the adsorbent is selected from CELITE, silica, alumina, aluminum oxide or bentonite; and in step (d) the insoluble adsorbent containing the cholesterol: saponin complex is removed by filtration, sedimentation or centrifugation.

OO The process of NN wherein:

in step (b) the saponin is prewashed with an organic solvent to remove some organic soluble materials and the saponin is obtained from Quillaja or Yucca plants and is of food grade quality, and in step (c) the diatomaceous earth is CELITE #535.

PP The process of OO wherein the saponin is obtained from Yucca.

QQ The process of claim KK which further includes:

step (f) separating the insoluble adsorbent containing the cholesterol:saponin complex, partial or totally, into its three components, namely adsorbent, cholesterol, and saponin.

RR The process of LL wherein the product is egg, marine oils or animal fat.

SS The process of RR wherein the mixing in steps (b) and (c) is at about 40° C. and the adsorbent is CELITE #545, and in step (d) the insoluble reactants are separated using filtration through CELITE #560 at between about 55° and 60° C.

While only a few general embodiments of the invention have been shown and described herein, it will become apparent to those skilled in the art that various modifications and changes can be made in the removal of cholesterol from dairy and other cholesterol containing products using saponins, with or without using adsorbent, without departing from the spirit and scope of the present invention. All such modifications and changes coming within the scope of the appended claims are intended to be carried out thereby.

We claim:

1. An improved process for the removal of cholesterol from a processed or unprocessed food product, which process comprises:
   (a) obtaining a processed or unprocessed food product containing cholesterol wherein said food product comprises a fat phase and an aqueous phase and if water is not present adding between about one and 5 fold by weight of water based on the weight of the food product;
   (b) treating the food product or food product: water mixture of step (a) with agitation at a temperature of between about 35° and 80° C. and for between about 0.1 and 16 hours with an amount of non-toxic food grade saponin effective to bind about 70% or more of the cholesterol present in the food product as a water soluble cholesterol: saponin complex in the aqueous phase;
   (c) separating the aqueous phase containing the water soluble cholesterol:saponin complex from the food product by mechanical means independently selected from centrifugation or decanting;
   (d) mixing the food product, said food product obtained from step (c) at a temperature of between about 35° and 80° C. with water in about 1 to 5 fold amount by weight of the amount of food obtained in step (c) for about 0.1 to 2 hours to remove residues of water soluble saponin and water soluble cholesterol:saponin complex;
   (e) separating said water of step (d) containing said residues of water soluble saponin and water soluble cholesterol:saponin complex from said food product by mechanical means, independently selected from centrifugation or decanting, and
   (f) recovering the food product having a reduced content of cholesterol.

2. The process of claim 1 wherein steps (b), (c) and (d) are repeated until a level of cholesterol removal in the food product is about 99% and removal of the residues of the water soluble saponin is achieved.

3. The process of claim 1 wherein the food product is a dairy product is selected from the group consisting of raw cream, pasteurized cream, butteroil, and anhydrous milk fat.

4. The process of claim 3 wherein the dairy product is butteroil, or anhydrous milk fat and the process of steps (a) to (e) are performed at between about 40° and 65° C.

5. The process of claim 4 wherein:
   in steps (b) the saponin is added via an aqueous solution at a concentration of about 0.40 g of quillaja powder/ml solution and the time of contact is between 0.1 and 16 hours;
   steps (a) to (c) are repeated until a level of cholesterol removal of about 99% is achieved, and
   steps (d) and (e) are repeated until the residues of water soluble saponin are removed from the cholesterol-reduced dairy product.

6. The process of claim 5 wherein:
   in step (b) the saponin used is prewashed with an organic solvent to remove organic soluble materials, and the saponin is of food grade quality.

7. The process of claim 1 which further includes: the repetition of steps (a) to (e) until a level of cholesterol reduction of about 99% is achieved, followed by step (g):
   (g) separating the aqueous phase containing the water soluble cholesterol:saponin complex, partially or totally, into its three components of water, cholesterol, and saponin.

8. The process of claim 3 wherein the dairy product is raw cream or pasteurized cream.

9. The process of claim 8 wherein
   steps (a) to (e) are performed at between about 40° and 65° C., and
   in steps (c) and (e) the aqueous phase containing the water soluble cholesterol:saponin complex and residues of water soluble saponin are separated from the food product using centrifugation.

10. A process for the removal of cholesterol from a cholesterol containing food product, which process comprises:
    (a) obtaining a food product containing cholesterol wherein said food product comprises a fat phase and an aqueous phase and adding about 1 to 5 fold by weight of water;
    (b) contacting the food product or food product: water mixture of step (a) under agitation at a temperature of between about 35° and 80° C. with an amount of water soluble saponin effective to bind the cholesterol present in the food product as a water soluble cholesterol: saponin complex in said aqueous phase;
    (c) separating the aqueous phase containing the water soluble cholesterol: saponin complex from the food product by mechanical means independently selected from centrifugation or decanting;
    (d) mixing said food product obtained from step (c) at a temperature of between about 35° and 80° C. with an effective amount of water for about 0.1 to 2 hours to remove any residues of water soluble saponin and water soluble cholesterol: saponin complex;
    (e) separating the water of step (d) containing said residues of water soluble saponin and water soluble cholesterol: saponin complex from the water insoluble food product by mechanical means independently selected from centrifugation or decanting;
    (f) recovering the food product having about 70% or more cholesterol removed.

11. The process of claim 10 wherein the food product is independently selected from the group consisting of dairy products, animal fats, and egg.

12. The process of claim 11 wherein the process of steps (b) to (f) is performed at between about 40° and 65° C.

13. The process of claim 12 wherein:
    in step (b) the saponin is added in about 20 fold excess of the cholesterol present and the time of contact is between about 0.1 and 16 hours;
    steps (a) to (c) are repeated until a desired reduced level of cholesterol removal is achieved; and
    steps (d) to (e) are repeated until a desired level of residues of saponin are present in the cholesterol-reduced food product.

14. The process of claim 13 wherein:
    in step (b) the saponin used is prewashed with an organic solvent to remove some organic soluble materials and the saponin is obtained from Quillaja or Yucca plants and is of food grade quality.

15. The process of claim 13 wherein the saponin is obtained from Yucca.

16. The process of claim 10 which further includes:
steps (a) to (e) are repeated until a desired level of cholesterol reduction is achieved followed by step (g):
(g) separating the aqueous phase containing the water soluble cholesterol:saponin complex, partially or totally, into its three components, water, cholesterol, and saponin.

17. The process of claim 16 wherein the food product is independently selected from the group consisting of egg, dairy product, and animal fat.

18. The process of claim 1 wherein the separation of said food product and aqueous phase is by centrifugation at between about 5,000 and 40,000 g.

19. The process of claim 10 wherein the separation of said food product and aqueous phase is by centrifugation at between about 5,000 and 40,000 g.

20. The process of claim 1 wherein
the food product is butteroil; steps (a) to (e) are performed at about 40° to 65° C.;
in steps (b) and (e) the separation is by centrifugation at about 16,000 g; and
steps (b), (c), (d) and (e) are repeated until the cholesterol removal is about 99%.

* * * * *